US00RE49377E

(19) United States
(12) Reissued Patent
Bauman et al.

(10) Patent Number: US RE49,377 E
(45) Date of Reissued Patent: Jan. 17, 2023

(54) DISTRIBUTED DIGITAL ANTENNA SYSTEM

(71) Applicant: CommScope Technologies LLC, Hickory, NC (US)

(72) Inventors: Donald R. Bauman, Waseca, MN (US); Philip M. Wala, Savage, MN (US); Jeffrey O. Brennan, Waseca, MN (US)

(73) Assignee: CommScope Technologies LLC, Hickory, NC (US)

(21) Appl. No.: 15/436,605

(22) Filed: Feb. 17, 2017

Related U.S. Patent Documents

Reissue of:
(64) Patent No.: 8,958,789
Issued: Feb. 17, 2015
Appl. No.: 10/395,743
Filed: Mar. 24, 2003

U.S. Applications:
(60) Provisional application No. 60/430,434, filed on Dec. 3, 2002.

(51) Int. Cl.
*H04B 10/2575* (2013.01)
*H04B 1/40* (2015.01)
*H04W 16/26* (2009.01)

(52) U.S. Cl.
CPC . *H04B 10/25759* (2013.01); *H04B 10/25755* (2013.01); *H04B 1/40* (2013.01); *H04W 16/26* (2013.01)

(58) Field of Classification Search
CPC ..... H04B 10/2575; H04B 10/25751; H04B 10/25752; H04B 10/25759; H04B 7/2606;
(Continued)

(56) References Cited

U.S. PATENT DOCUMENTS 3,783,385 A 1/1974 Dunn et al.
3,931,473 A 1/1976 Ferris, Jr.
(Continued)

FOREIGN PATENT DOCUMENTS

CA 2008900 10/1990
CA 2008900 1/1998
(Continued)

OTHER PUBLICATIONS

Grace, "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

*Primary Examiner* — Minh Dieu Nguyen
(74) *Attorney, Agent, or Firm* — Fogg & Powers LLC

(57) ABSTRACT

An optical medium, such as fiber, is tapped to provide an antenna port wherever radio service coverage is desired. Each antenna port is a bi-directional remote unit that receives a digital optical signal from a host unit and transforms the signal to a radio frequency signal for transmission by the remote unit. The remote unit receives radio frequency signals that are converted to digital signals and summed with signals from other remote units and converted to an optical signal for transmission to the host unit.

25 Claims, 4 Drawing Sheets

(58) Field of Classification Search
CPC ..... H04B 7/17; H04B 7/165; H04B 7/15592; H04B 7/15585; H04B 7/15578; H04B 7/15571; H04B 7/15564; H04B 7/15557; H04B 7/1555; H04B 7/15542; H04L 12/2885; H04W 88/04; H04W 16/26
USPC ..... 455/422.1, 232.1, 7, 11.1, 13.2; 342/58; 359/245; 398/115, 116
See application file for complete search history.

(56) References Cited

U.S. PATENT DOCUMENTS 3,958,410 A 5/1976 Bell et al.
4,101,834 A 7/1978 Stutt et al.
4,112,488 A 9/1978 Smith, III
4,144,409 A 3/1979 Utano et al.
4,144,411 A 3/1979 Frenkiel
4,183,054 A 1/1980 Patisaul et al.
4,231,116 A 10/1980 Sekiguchi et al.
4,244,046 A 1/1981 Brouard et al.
4,354,167 A 10/1982 Terreault et al.
4,402,076 A 8/1983 Krajewski
4,451,699 A 5/1984 Gruenberg
4,451,916 A 5/1984 Casper et al.
4,456,793 A 6/1984 Baker et al.
4,475,010 A 10/1984 Huensch et al.
4,485,486 A 11/1984 Webb et al.
4,525,861 A 6/1985 Freeburg
4,531,239 A 7/1985 Usui
4,556,760 A 12/1985 Goldman
4,596,051 A 6/1986 Feldman
4,611,323 A 9/1986 Hessenmuller
4,613,990 A 9/1986 Halpern
4,628,501 A 12/1986 Loscoe
4,654,843 A 3/1987 Roza et al.
4,667,319 A 5/1987 Chum
4,669,107 A 5/1987 Eriksson-Lennartsson
4,691,292 A 9/1987 Rothweiler
4,701,909 A 10/1987 Kavehrad et al.
4,704,733 A 11/1987 Kawano
4,718,004 A 1/1988 Dalal
4,726,644 A 2/1988 Mathis
4,754,451 A 6/1988 Eng et al.
4,755,795 A 7/1988 Page
4,759,000 A 7/1988 Reitz
4,759,051 A 7/1988 Han
4,759,057 A 7/1988 De Luca et al.
4,760,573 A 7/1988 Calvignac et al.
4,779,064 A 10/1988 Monser
4,790,000 A 12/1988 Kinoshita
4,797,947 A 1/1989 Labedz
4,812,846 A 3/1989 Noro
4,816,825 A 3/1989 Chan et al.
4,831,662 A 5/1989 Kuhn
4,849,963 A 7/1989 Kawano et al.
4,868,862 A 9/1989 Ryoichi et al.
4,881,082 A 11/1989 Graziano
4,916,460 A 4/1990 Powell
4,920,533 A 4/1990 Dufresne et al.
4,932,049 A 6/1990 Lee
4,959,829 A 9/1990 Griesing
4,977,593 A 12/1990 Ballance
4,999,831 A 3/1991 Grace
5,067,147 A 11/1991 Lee
5,067,173 A 11/1991 Gordon et al.
5,084,869 A 1/1992 Russell
5,134,709 A 7/1992 Bi et al.
5,136,410 A 8/1992 Heiling et al.
5,138,440 A 8/1992 Radice
5,159,479 A 10/1992 Takagi
5,164,914 A 11/1992 Anderson
5,175,867 A 12/1992 Wejke et al.
5,193,109 A 3/1993 Chien-Yeh Lee
5,243,598 A 9/1993 Lee
5,251,053 A 10/1993 Heidemann
5,265,039 A 11/1993 Curbelo et al.
5,267,261 A 11/1993 Blakeney, II et al.
5,272,700 A 12/1993 Hansen et al.
5,278,690 A 1/1994 Vella-Coleiro
5,280,472 A 1/1994 Gilhousen et al.
5,285,469 A 2/1994 Vanderpool
5,297,193 A 3/1994 Bouix et al.
5,299,198 A 3/1994 Kay et al.
5,301,056 A 4/1994 O'Neill
5,303,287 A 4/1994 Laborde
5,305,308 A 4/1994 English et al.
5,309,474 A 5/1994 Gilhousen et al.
5,313,461 A 5/1994 Ahl et al.
5,321,736 A 6/1994 Beasley
5,321,849 A 6/1994 Lemson
5,339,184 A 8/1994 Tang
5,379,455 A 1/1995 Koschek
5,381,459 A 1/1995 Lappington
5,392,453 A 2/1995 Gudmundson et al.
5,400,391 A 3/1995 Emura et al.
5,442,681 A 8/1995 Kotzin et al.
5,442,700 A 8/1995 Snell et al.
5,457,557 A * 10/1995 Zarem et al. ..... 398/116
5,461,627 A 10/1995 Rypinski
5,499,047 A 3/1996 Terry et al.
5,513,176 A 4/1996 Dean et al.
5,519,691 A 5/1996 Darcie et al.
5,528,582 A 6/1996 Bodeep et al.
5,533,011 A 7/1996 Dean et al.
5,546,397 A 8/1996 Mahany
5,552,920 A * 9/1996 Glynn ..... 398/126
5,566,168 A 10/1996 Dent
5,579,341 A 11/1996 Smith et al.
5,586,121 A 12/1996 Moura et al.
5,587,734 A 12/1996 Lauder et al.
5,592,470 A 1/1997 Rudrapatna et al.
5,603,080 A 2/1997 Källander et al.
5,606,736 A 2/1997 Hasler et al.
5,619,202 A 4/1997 Wilson et al.
5,621,730 A 4/1997 Kelley
5,621,786 A 4/1997 Fischer et al.
5,627,879 A 5/1997 Russell et al.
5,630,204 A 5/1997 Hylton et al.
5,631,757 A 5/1997 Bodeep et al.
5,642,405 A 6/1997 Fischer et al.
5,644,622 A 7/1997 Russell et al.
5,657,374 A 8/1997 Russell et al.
5,682,256 A 10/1997 Motley et al.
5,708,961 A 1/1998 Hylton et al.
5,715,235 A 2/1998 Sawahashi et al.
5,724,385 A * 3/1998 Levin et al. ..... 375/146
5,732,076 A 3/1998 Ketseoglou et al.
5,748,683 A 5/1998 Smith et al.
5,752,170 A 5/1998 Clifford
5,761,619 A 6/1998 Danne et al.
5,765,097 A 6/1998 Dail
5,765,099 A 6/1998 Georges et al.
5,771,449 A 6/1998 Blasing et al.
5,774,085 A 6/1998 Yanagimoto et al.
5,774,660 A 6/1998 Brendel et al.
5,774,789 A 6/1998 Van der Kaay et al.
5,781,541 A 7/1998 Schneider
5,781,859 A 7/1998 Beasley
5,781,865 A 7/1998 Gammon
5,802,173 A 9/1998 Hamilton-Piercy et al.
5,805,983 A 9/1998 Naidu et al.
5,809,395 A 9/1998 Hamilton-Piercy et al.
5,809,422 A 9/1998 Raleigh et al.
5,809,431 A 9/1998 Bustamante et al.
5,812,605 A 9/1998 Smith et al.
5,818,883 A 10/1998 Smith et al.
5,822,324 A 10/1998 Kostresti et al.
5,852,651 A 12/1998 Fischer et al.
5,874,914 A 2/1999 Krasner
5,878,325 A 3/1999 Dail
5,880,863 A * 3/1999 Rideout ..... H04B 10/25753 398/59
5,883,882 A 3/1999 Schwartz
5,907,544 A 5/1999 Rypinski

(56) References Cited

U.S. PATENT DOCUMENTS 5,930,682 A 7/1999 Schwartz et al.
5,946,622 A 8/1999 Bojeryd
5,969,837 A 10/1999 Farber et al.
5,978,650 A 11/1999 Fischer et al.
5,987,014 A 11/1999 Magill et al.
6,005,506 A 12/1999 Bazarjani et al.
6,005,884 A 12/1999 Cook et al.
6,009,130 A * 12/1999 Lurey et al. ..... 375/347
6,014,366 A 1/2000 Ichiyoshi
6,034,950 A 3/2000 Sauer et al.
6,061,089 A * 5/2000 Tonkin et al. ..... 348/211.6
6,108,113 A 8/2000 Fee
6,108,550 A 8/2000 Wiorek et al.
6,108,626 A 8/2000 Cellario et al.
6,112,086 A 8/2000 Wala
6,122,529 A 9/2000 Sabat, Jr. et al.
6,128,470 A 10/2000 Naidu
6,128,471 A 10/2000 Quelch et al.
6,147,786 A 11/2000 Pan
6,150,993 A 11/2000 Dobrovolny
6,157,659 A 12/2000 Bird
6,181,687 B1 1/2001 Bisdikian
6,188,693 B1 2/2001 Murakami
6,192,216 B1 2/2001 Sabat, Jr. et al.
6,198,558 B1 3/2001 Graves et al.
6,222,660 B1 4/2001 Traa
6,223,021 B1 4/2001 Silvia et al.
6,226,274 B1 5/2001 Reese et al.
6,253,094 B1 6/2001 Schmutz
6,259,910 B1 7/2001 Fairfield et al.
6,262,981 B1 7/2001 Schmutz
6,263,135 B1 * 7/2001 Wade ..... 385/37
6,275,990 B1 8/2001 Dapper et al.
6,298,246 B1 10/2001 Lysejko et al.
6,307,877 B1 10/2001 Philips et al.
6,308,085 B1 10/2001 Shoki
6,317,884 B1 11/2001 Eames et al.
6,336,042 B1 1/2002 Dawson
6,337,754 B1 * 1/2002 Imajo ..... 398/115
6,349,200 B1 2/2002 Sabat, Jr. et al.
6,353,600 B1 3/2002 Schwartz et al.
6,356,369 B1 3/2002 Farhan
6,356,374 B1 3/2002 Farhan
6,362,908 B1 3/2002 Kimbrough et al.
6,373,611 B1 4/2002 Farhan et al.
6,373,887 B1 4/2002 Aiyagari et al.
6,374,124 B1 4/2002 Slabinski
6,377,640 B2 4/2002 Trans
6,442,405 B1 8/2002 Hiramatsu et al.
6,449,071 B1 9/2002 Farhan et al.
6,463,301 B1 * 10/2002 Bevan et al. ..... 455/562.1
6,466,572 B1 10/2002 Ethridge et al.
6,480,551 B1 11/2002 Ohishi et al.
6,480,702 B1 11/2002 Sabat, Jr.
6,486,907 B1 * 11/2002 Farber et al. ..... 725/78
6,496,546 B1 12/2002 Mlpress et al.
6,498,936 B1 12/2002 Raith
6,504,831 B1 1/2003 Greenwood et al.
6,535,720 B1 3/2003 Kintis et al.
6,567,473 B1 5/2003 Tzannes
6,580,905 B1 6/2003 Naidu et al.
6,594,496 B2 7/2003 Schwartz
6,622,013 B1 9/2003 Miyoshi et al.
6,643,498 B1 11/2003 Miyajima
6,667,973 B1 12/2003 Gorshe et al.
6,674,966 B1 1/2004 Koonen
6,697,603 B1 2/2004 Lovinggood et al.
6,704,545 B1 3/2004 Wala ..... H04B 10/25754 455/16
6,729,929 B1 5/2004 Sayers et al.
6,731,904 B1 5/2004 Judd
6,738,581 B2 * 5/2004 Handelman ..... 398/79
6,745,003 B1 6/2004 Maca et al.
6,751,417 B1 6/2004 Combs et al.
6,768,745 B1 7/2004 Gorshe et al.
6,771,933 B1 8/2004 Eng et al.
6,785,558 B1 8/2004 Stratford et al.
6,799,020 B1 9/2004 Heidmann et al.
6,801,767 B1 10/2004 Schwartz et al.
6,807,374 B1 10/2004 Imajo et al.
6,826,163 B2 11/2004 Mani et al.
6,826,164 B2 11/2004 Mani et al.
6,831,901 B2 12/2004 Millar
6,865,390 B2 3/2005 Goss et al.
6,907,048 B1 6/2005 Treadaway et al.
6,917,614 B1 7/2005 Laubach et al.
6,963,552 B2 11/2005 Sabat, Jr. et al.
6,967,966 B1 11/2005 Donohue
6,980,831 B2 * 12/2005 Matsuyoshi et al. ..... 455/561
7,016,308 B1 3/2006 Gallagher
7,031,335 B1 4/2006 Donohue et al.
7,035,671 B2 4/2006 Solum
7,047,313 B1 5/2006 Broerman
7,075,369 B2 7/2006 Takenaka
7,103,279 B1 9/2006 Koh et al.
7,103,377 B2 9/2006 Bauman et al.
7,127,175 B2 * 10/2006 Mani et al. ..... 398/115
7,171,244 B2 1/2007 Bauman
7,184,728 B2 2/2007 Solum
7,190,903 B1 3/2007 Combs et al.
7,205,864 B2 4/2007 Schultz, Jr. et al.
7,215,651 B2 5/2007 Millar
7,257,328 B2 8/2007 Levinson et al.
7,289,972 B2 10/2007 Rieser et al.
7,359,447 B2 4/2008 Sage
RE40,564 E 11/2008 Fischer et al.
7,505,747 B2 3/2009 Solum
7,512,419 B2 3/2009 Solum
7,539,509 B2 5/2009 Bauman et al.
7,548,695 B2 6/2009 Wake
7,610,046 B2 10/2009 Wala
7,614,074 B2 11/2009 Mobley et al.
7,639,982 B2 12/2009 Wala
7,702,985 B2 4/2010 Millar
7,761,093 B2 7/2010 Sabat, Jr. et al.
7,848,747 B2 12/2010 Wala
7,848,770 B2 12/2010 Scheinert
7,917,177 B2 3/2011 Bauman
7,920,858 B2 4/2011 Sabat, Jr. et al.
7,962,111 B2 6/2011 Solum
8,019,221 B2 9/2011 Zancewicz
8,032,916 B2 10/2011 Oyadomari et al.
8,160,570 B2 4/2012 Sabat, Jr. et al.
8,290,483 B2 10/2012 Sabat, Jr. et al.
8,326,218 B2 12/2012 Wala
8,346,091 B2 * 1/2013 Kummetz ..... H04W 88/085 398/115
RE43,964 E 2/2013 Fischer et al.
8,446,530 B2 5/2013 Bellers
8,559,939 B2 10/2013 Sabat, Jr. et al.
8,577,286 B2 11/2013 Wala
RE45,321 E 1/2015 Fischer et al.
8,958,789 B2 2/2015 Bauman et al.
9,332,402 B2 5/2016 Wala
9,467,876 B2 10/2016 Kummetz et al.
9,867,052 B2 1/2018 Sabat, Jr. et al.
10,075,243 B2 9/2018 Fischer et al.
2001/0031014 A1 10/2001 Subramanian et al.
2001/0036163 A1 11/2001 Sabat, Jr. et al.
2002/0003645 A1 * 1/2002 Kim et al. ..... 359/145
2002/0072329 A1 6/2002 Bandeira et al.
2002/0167954 A1 11/2002 Highsmith et al.
2002/0191565 A1 12/2002 Mani et al.
2003/0043928 A1 3/2003 Ling et al.
2003/0060178 A1 3/2003 Ghassemzadeh
2003/0066087 A1 4/2003 Sawyer et al.
2003/0133182 A1 7/2003 Ng et al.
2003/0143947 A1 * 7/2003 Lyu ..... 455/7
2003/0157943 A1 8/2003 Sabat, Jr.
2003/0162516 A1 8/2003 Solum
2004/0010609 A1 1/2004 Vilander et al.
2004/0037565 A1 2/2004 Young et al.
2004/0198453 A1 10/2004 Cutrer et al.
2004/0219950 A1 11/2004 Pallonen et al.

(56) References Cited

U.S. PATENT DOCUMENTS

| | | | |
|---|---|---|---|
| 2005/0007993 | A1 | 1/2005 | Chambers et al. |
| 2005/0131645 | A1 | 6/2005 | Panopoulos |
| 2005/0147067 | A1 | 7/2005 | Mani et al. |
| 2005/0201323 | A1 | 9/2005 | Mani et al. |
| 2005/0243785 | A1 | 11/2005 | Sabat, Jr. et al. |
| 2005/0250503 | A1 | 11/2005 | Cutrer |
| 2006/0121944 | A1 | 6/2006 | Buscaglia et al. |
| 2006/0193295 | A1 | 8/2006 | White et al. |
| 2007/0166036 | A1 | 7/2007 | Combs et al. |
| 2009/0034979 | A1 | 2/2009 | Zancewicz |
| 2009/0067841 | A1 | 3/2009 | Combs et al. |
| 2010/0061291 | A1 | 3/2010 | Wala |
| 2011/0182583 | A1 | 7/2011 | Rakib |
| 2011/0265140 | A1 | 10/2011 | Rakib |
| 2014/0016583 | A1 | 1/2014 | Smith |
| 2014/0036758 | A1 | 2/2014 | Wala |
| 2016/0056874 | A1 | 2/2016 | Wala |
| 2016/0248508 | A1 | 8/2016 | Wala |
| 2017/0026857 | A1 | 1/2017 | Kummetz et al. |
| 2017/0214460 | A1 | 7/2017 | Wala |
| 2018/0115910 | A1 | 4/2018 | Sabat et al. |
| 2018/0278299 | A1 | 9/2018 | Morrison |

FOREIGN PATENT DOCUMENTS

| | | | |
|---|---|---|---|
| CN | 1127056 | | 7/1996 |
| CN | 1362799 | A | 8/2002 |
| DE | 3707244 | | 9/1988 |
| EP | 0166885 | | 1/1986 |
| EP | 0166885 | A2 | 1/1986 |
| EP | 0346925 | | 12/1989 |
| EP | 0346925 | A2 | 12/1989 |
| EP | 0368673 | | 5/1990 |
| EP | 0368673 | A1 | 5/1990 |
| EP | 0391597 | | 10/1990 |
| EP | 0391597 | A2 | 10/1990 |
| EP | 0468688 | | 1/1992 |
| EP | 0468688 | A2 | 1/1992 |
| EP | 0642243 | | 3/1995 |
| EP | 0664621 | | 7/1995 |
| EP | 0876073 | | 11/1998 |
| EP | 2290850 | | 3/2011 |
| EP | 2290850 | A1 | 3/2011 |
| EP | 1303929 | | 10/2011 |
| EP | 1570626 | B1 | 11/2013 |
| EP | 2290850 | B1 | 5/2016 |
| EP | 3035562 | | 6/2016 |
| FR | 2345865 | | 10/1977 |
| GB | 2253770 | | 9/1992 |
| GB | 2289198 | | 11/1995 |
| GB | 2300549 | | 11/1996 |
| GB | 2315959 | | 2/1998 |
| GB | 2320653 | | 6/1998 |
| IT | 540424 | | 4/1957 |
| JP | 58-164007 | | 9/1983 |
| JP | 58164007 | | 9/1983 |
| JP | 3-26031 | | 2/1991 |
| JP | 3026031 | | 2/1991 |
| JP | 512374 | | 1/1993 |
| JP | H5153021 | | 6/1993 |
| JP | H5268128 | | 10/1993 |
| JP | 6318905 | | 11/1994 |
| JP | 8510878 | | 11/1996 |
| JP | 11234200 | | 8/1999 |
| JP | 2002354534 | | 12/2002 |
| KR | 19990064537 | A | 8/1999 |
| KR | 1020000060899 | A | 10/2000 |
| KR | 1020010018675 | A | 3/2001 |
| KR | 1020010048227 | A | 6/2001 |
| KR | 100594770 | B1 | 6/2006 |
| WO | 9115927 | | 10/1991 |
| WO | 9428690 | A1 | 12/1994 |
| WO | 9533350 | | 12/1995 |
| WO | 9628946 | | 9/1996 |
| WO | 9705704 | A1 | 2/1997 |
| WO | 9716000 | | 5/1997 |
| WO | 9732442 | | 9/1997 |
| WO | 9824256 | | 6/1998 |
| WO | 9837715 | | 8/1998 |
| WO | 9937035 | | 7/1999 |
| WO | 9948312 | | 9/1999 |
| WO | 0021221 | | 4/2000 |
| WO | 0021337 | A2 | 4/2000 |
| WO | 0156197 | | 8/2001 |
| WO | 0174013 | | 10/2001 |
| WO | 0174100 | | 10/2001 |
| WO | 0209319 | | 1/2002 |
| WO | 0239624 | | 5/2002 |
| WO | 02067468 | A1 | 8/2002 |
| WO | 2004051322 | | 6/2004 |

OTHER PUBLICATIONS

Graf, "Modern Dictionary of Electronics—Seventh Edition", 1999, pp. 1-9.

Grundmann et al., "An Empirical Comparison of a Distributed Antenna Microcell System Versus a Single Antenna Microcell System for Indoor Spread Spectrum Communications at 1.8 GHz", "ICUPC '93", 1993, pp. 59-63, Publisher: IEEE.

Gupta et al., "Land Mobile Radio Systems—A Tutorial Exposition", Jun. 1985, pp. 34-45, vol. 23, No. 6, Publisher: IEEE Communications Magazine.

Ishio et al, "A Two-Way Wavelength—Division-Multiplexing Transmission and Its Application to a Switched TV Distribution System", "Conference Record, Fourth European Conference On Optical Communication", Sep. 12, 1978, pp. 645-665, Publisher: IIC.

Titch, "Kentrox Boosts Coverage and Capacity", "Telephony", Jan. 25, 1993, pp. 11-12.

Merrett et al., "A Cordless Access System Using Radio-Over-Fibre Techniques", "Gateway to the Future Technology in Motion", May 22, 1991, Page(s) Cover—924, Publisher: 41st IEEE Vehicular Technology Conference.

Microwaves & RF, "Digital Transport for Cellular", Feb. 1993, p. 1.

Microwaves & RF, "Offshore Markets Gain in Size, Competitiveness", Mar. 1993, pp. 1-8, vol. 32, No. 3.

Nakatsugawa et al., "Software Radio Base and Personal Stations for Cellular/PCS Systems", "Vehicular Technology Conference Proceedings", May 18, 2000, pp. 617-621, Publisher: IEEE.

O'Byrne, "TDMA and CDMA in a Fiber-Optic Environment", "Vehicular Technology Conference, 1988, IEEE 38th", Jun. 1992, pp. 727-731, Publisher: IEEE.

Oades, "The Linear RF Repeater", "1980 International Conference on Communications", Jun. 8-12, 1980, p. 1, Publisher: IEEE, Published in: Seattle, WA.

Quinn, "The Cell Enhancer", "Vehicular Technology Conference", May 22, 1986, pp. 77-83, Publisher: Bell Atlantic Mobile Systems.

Rosenbloom et al., "Cell Enhancer: Beyond the Outer Limits", , pp. 1-2.

Kobb, "Personal Wireless", Jun. 1993, pp. 1-8, vol. 30, No. 6, Publisher: IEEE, Published in: US.

Steele, "Towards a High-Capacity Digital Cellular Mobile Radio System", "Special Issue on Land Mobile Radio", Aug. 1985, pp. 405-415, vol. 132, No. Pt. F, No. 5, Publisher: IEEE Proceedings.

Tang, "Fiber-Optic Antenna Remoting for Multisector Cellular Cell Sites", Jan. 1, 1992, pp. 76-81, Publisher: GTE Laboratories, Published in: US.

Tektronix, "Synchronous Optical Network (SONET)", "http://www.iec.org/online/tutorials/sonet/topic03.html", Aug. 28, 2002, pp. 1-5, Publisher International Engineering Consortium.

Russell, "New Microcell Technology Sets Cellular Carriers Free", "Telephony Mar. 1993", pp. 40-42, Publisher: ADC Kentrox, Published in: US.

GTE Laboratories, "Urban Microcell System Layout", "GTE Laboratories Conference", Jun. 14-18, 1992, pp. 1-13, Published in: US.

Wala, "A New Microcell Architecture Using Digital Optical Transport", "Freedom Through Wireless Technology", May 18, 1993, pp. 585-588, Publisher: Proceedings of the Vehicular Technology Conference, New York, IEEE, Published in: US.

(56) References Cited

OTHER PUBLICATIONS

Lee et al., "Intelligent Microcell Applications in PCS", "Vehicular Technology Conference, 1993., 43rd IEEE", May 20, 1993, pp. 721-727, Publisher: IEEE.
Zhaohui et al., "A Rake Type Receiver Structure for CDMA Mobile Communication Systems Using Antenna Arrays", 1996, pp. 528-530, Publisher: IEEE.
Zonemaster, "Maximum Coverage for High-Capacity Locations", "Decibel Products", 1993, pp. 1-4, Publisher: Decibel Multi Media Microcell System.
China Patent Office, "Notice of Grant of Patent Right for Invention from CN Application No. 01815499.99 ", "from Foreign Counterpart to U.S. Appl. No. 09/619,431", dated Oct. 24, 2008, pp. 1-4, Published in: CN.
European Patent Office, "Communication under Rule 71(3) for EP Application No. 03790242.6", "foreign Counterpart to U.S. Appl. No. 10/395,743", dated May 14, 2013, pp. 1-27.
European Patent Office, "Communication pursuant to Article 96(2) from EP Application No. 03790242.6", "Foreign Counterpart to U.S. Appl. No. 10/395,743", dated Jul. 24, 2007, pp. 1-4.
ADC Kentrox, "ADC Kentrox Introduces Innovative Wireless Network Access Solution Cellular Subscribers Offered a New Level of Portable Service", Mar. 1, 1993, pp. 1-3, Publisher: ADC Kentrox, Published in: Portland, OR.
Patent Office of the People's Republic of China, "Notice of Grant of Patent Right for Invention from CN Application No. 94192782.2", "from Foreign Counterpart of U.S. Appl. No. 08/204,660", dated Sep. 29, 2000, pp. 1-4, Published in: CN.
Japan Patent Office, "Office Action from JP Application No. 6-525837", "from foreign counterpart of U.S. Appl. No. 08/204,660", dated Oct. 14, 2003, pp. 1-2, Published in: JP.
United States Patent and Trademark Office, "Final Office Action", "U.S. Appl. No. 38/204,660", dated Jun. 12, 1996, pp. 1-8, Published in: US.
U.S. Patent and Trademark Office, "Notice of Allowance", "U.S. Appl. No. 08/204,660", dated Oct. 2, 1996, pp. 1-4, Published in: US.
U.S. Patent and Trademark Office, "Office Action", "U.S. Appl. No. 08/204,660", dated Apr. 4, 1995, pp. 1-14, Published in: US.
U.S. Patent and Trademark Office, "Office Action", "U.S. Appl. No. 08/204,660", dated Oct. 26, 1995, pp. 1-8, Published in: US.
U.S. Patent and Trademark Office, "Office Action", "U.S. Appl. No. 08/299,159", dated Feb. 19, 1997, pp. 1-9, Published in: US.
U.S. Patent and Trademark Office, "Restriction Requirement", "U.S. Appl. No. 08/204,660", dated Mar. 10, 1995, pp. 1-13, Published in: US.
U.S. Patent and Trademark Office, "Notice of Intent to Issue a Reexam Certificate", "U.S. Appl. No. 90/010,357", dated Jun. 22, 2010, pp. 1-18, Published in: US.
U.S. Patent and Trademark Office, "Order Granting/Denying Request for Ex Parte Reexamination", "U.S. Appl. No. 90/010,357", dated Mar. 12, 2009, pp. 1-10, Published in: US.
U.S. Patent and Trademark Office, "Office Action", "U.S. Appl. No. 90/010,357", dated Sep. 25, 2009, pp. 1-17, Published in: US.
U.S. Patent and Trademark Office, "Office Action", "U.S. Appl. No. 08/294,742", dated May 27, 1996, pp. 1-5, Published in: US.
U.S. Patent and Trademark Office, "Office Action", "U.S. Appl. No. 08/294,742", dated Oct. 26, 1996, pp. 1-4, Published in: US.
U.S. Patent and Trademark Office, "Office Action", "U.S. Appl. No. 08/298,652", dated May 29, 1995, pp. 1-7, Published in: US.
U.S. Patent and Trademark Office, "Notice of Allowance", "U.S. Appl. No. 08/299,159", dated Aug. 19, 1997, pp. 1-9, Published in: US.
U.S. Patent and Trademark Office, "Office Action", "U.S. Appl. No. 08/299,159", dated Jul. 17, 1995, pp. 1-5, Published in: US.
U.S. Patent and Trademark Office, "Office Action", "U.S. Appl. No. 08/299,159", dated Apr. 9, 1996, pp. 1-3, Published in: US.
U.S. Patent and Trademark Office, "Office Action", "U.S. Appl. No. 08/299,159", dated Oct. 2, 1996, pp. 1-2, Published in: US.
U.S. Patent and Trademark Office, "Notice of Allowance", "U.S. Appl. No. 08/410,129", dated Oct. 17, 1996, pp. 1-6, Published in: US.
U.S. Patent and Trademark Office, "Office Action", "U.S. Appl. No. 08/410,129", dated Jan. 23, 1996, pp. 1-12, Published in: US.
U.S. Patent and Trademark Office, "Notice of Intent to Issue a Reexam Certificate", "U.S. Appl. No. 90/010,362", dated Jun. 22, 2010, pp. 1-16, Published in: US.
U.S. Patent and Trademark Office, "Order Granting/Denying Request for Ex Parte Reexamination", "U.S. Appl. No. 90/010,362", dated Apr. 17, 2009, pp. 1-8, Published in: US.
U.S. Patent and Trademark Office, "Office Action", "U.S. Appl. No. 90/010,362", dated Sep. 25, 2009, pp. 1-18, Published in: US.
U.S. Patent and Trademark Office, "Notice of Allowance", "U.S. Appl. No. 09/747,273", dated Aug. 8, 2007, pp. 1-8.
U.S. Patent and Trademark Office, "Office Action", "U.S. Appl. No. 09/747,273", dated Mar. 30, 2004, pp. 1-19.
U.S. Patent and Trademark Office, "Office Action", "U.S. Appl. No. 09/747,273", dated Oct. 6, 2005, pp. 1-10.
U.S. Patent and Trademark Office, "Final Office Action", "U.S. Appl. No. 90/010,363", dated Jun. 23, 2010, pp. 1-21, Published in: US.
U.S. Patent and Trademark Office, "Notice of Intent to Issue a Reexam Certificate", "U.S. Appl. No. 90/010,363", dated Dec. 6, 2010, pp. 1-21, Published in: US.
U.S. Patent and Trademark Office, "Order Granting/Denying Request for Ex Parte Reexamination", "U.S. Appl. No. 09/010,363", dated Apr. 17, 2009, pp. 1-10, Published in: US.
U.S. Patent and Trademark Office, "Office Action", "U.S. Appl. No. 90/010,363", dated Sep. 25, 2009, pp. 1-32, Published in: US.
U.S. Patent and Trademark Office, "Advisory Action", "U.S. Appl. No. 11/937,255", dated Nov. 3, 2011, pp. 1-2.
U.S. Patent and Trademark Office, "Final Office Action", "U.S. Appl. No. 11/937,255", dated Aug. 29, 2011, pp. 1-14.
U.S. Patent and Trademark Office, "Notice of Allowance", "U.S. Appl. No. 11/937,255", dated Sep. 17, 2012, pp. 1-11, Published in: US.
U.S. Patent and Trademark Office, "Office Action", "U.S. Appl. No. 11/937,255", dated Feb. 17, 2011, pp. 1-13.
U.S. Patent and Trademark Office, "Office Action", "U.S. Appl. No. 13/725,866", dated Jan. 22, 2014, pp. 1-28, Published in: US.
U.S. Patent and Trademark Office, "Restriction Requirement", "U.S. Appl. No. 13/725,866", dated Sep. 10, 2013, pp. 1-8, Published in: US.
The International Search Authority, "International Preliminary Report on Patentabilityfrom PCT/US94/05897", dated May 29, 1995, pp. 1-8, Publisher: from PCT Counterpart of U.S. Appl. No. 08/204,660, Published in: WO.
The International Search Authority, "International Search Report from PCT/US94/05897", "from PCT Counterpart of U.S. Appl. No. 08/204,660", dated Oct. 31, 1994, pp. 1-7, Published in: WO.
The International Bureau of WIPO, "Written Opinion from PCT/U594/05897", "from PCT Counterpart to U.S. Appl. No. 08/2004,660", dated Feb. 14, 1995, pp. 1-7, Published in: CH.
Brazilian Patent Office, "Office Action for Brazil Application No. PI0112653-9", "from Foreign Counterpart to U.S. Appl. No. 09/619,431", dated Apr. 8, 2015, pp. 1-14, Published in: BR.
Brazilian Patent Office, "Office Action for Brazil Application No. PI0112653-9", "from Foreign Counterpart to U.S. Appl. No. 09/619,431", dated Jan. 8, 2016, pp. 1-7, Published in: BR.
State Intellectual Property Office of People's Republic of China, "First Office Action for CN Application No. 01815499.9", "from Foreign Counterpart of U.S. Appl. No. 09/619,431", dated Jul. 8, 2005, pp. 1-8, Published in: CN.
State Intellectual Property Office of People's Republic of China, "Second Office Action for CN Application No. 01815499.9", "from Foreign Counterpart of U.S. Appl. No. 09/619,431", dated May 11, 2007, pp. 1-5, Published in: CN.
State Intellectual Property Office of People's Republic of China, "Third Office Action for CN Application No. 01815499.9", "from Foreign Counterpart of U.S. Appl. No. 09/619,431", dated Oct. 26, 2007, pp. 1-8, Published in: CN.

(56) References Cited

OTHER PUBLICATIONS

State Intellectual Property Office of People's Republic of China, "Fourth Office Action for CN Application No. 01815499.9", "from Foreign Counterpart of U.S. Appl. No. 09/619,431", dated Mar. 7, 2007, pp. 1-8, Published in: CN.
State Intellectual Property Office of People's Republic of China, "Notification to Grant Patent Right for Invention from CN Application 200710153587.X", "from Foreign Counterpart of U.S. Appl. No. 09/619,431", dated May 28, 2013, pp. 1-3, Published in: CN.
State Intellectual Property Office of People's Republic of China, "Second Office Action from CN Application No. 200710153587.X", "from Foreign Counterpart of U.S. Appl. No. 09/619,431", dated Feb. 4, 2013, pp. 1-7, Published in: CN.
State Intellectual Property Office of People's Republic of China, "First Office Action for CN Application No. 200710153587", "from Foreign Counterpart of U.S. Appl. No. 09/619,431", dated Mar. 19, 2010, pp. 1-7, Published in: CN.
State Intellectual Property Office of People's Republic of China, "Office Action for CN Application No. 200710153587", "from Foreign Counterpart of U.S. Appl. No. 09/619,431", dated Nov. 2, 2010, pp. 1-9, Published in: CN.
State Intellectual Property Office of People's Republic of China, "Notice of Reexamination for CN Application No. 200710153587", "from Foreign Counterpart of U.S. Appl. No. 09/619,431", dated Jun. 21, 2012, pp. 1-8, Published in: CN.
State Intellectual Property Office of People's Republic of China, "Second Office Action for CN Application No. 200910005002.9", "from Foreign Counterpart of U.S. Appl. No. 09/619,431", dated Jan. 23, 2013, pp. 1-11, Published in: CN.
State Intellectual Property Office of People's Republic of China, "Notification to Grant Patent Right for Invention from CN200910005002.9", "from Foreign Counterpart of U.S. Appl. No. 09/619,431", Aug. 19, 2013, pp. 1-6, Published in: CN.
Patent Office P.R. China, "Office Action from CN Application No. 01815499.9 dated Mar. 7, 2008", from Foreign Counterpart to U.S. Appl. No. 09/619,431, dated Mar. 7, 2008, pp. 1-8, Published: CN.
U.S. Patent and Trademark Office, "Final Office Action", U.S. Appl. No. 15/144,219, dated Dec. 4, 2018, pp. 1-59, Published: US.
U.S. Patent and Trademark Office, "Interview Summary", U.S. Appl. No. 15/144,219, dated Nov. 16, 2016, pp. 1-11, Published: US.
U.S. Patent and Trademark Office, "Interview Summary", U.S. Appl. No. 15/144,219, dated Mar. 26, 2018, pp. 1-13, Published: US.
U.S. Patent and Trademark Office, "Interview Summary", U.S. Appl. No. 15/144,219, dated Sep. 29, 2017, pp. 1-14, Published: US.
U.S. Patent and Trademark Office, "Office Action", U.S. Appl. No. 15/483,432, dated Oct. 11, 2017, pp. 1-15, Published: US.
U.S. Patent and Trademark Office, "Office Action", U.S. Appl. No. 15/483,432, dated Dec. 17, 2018, pp. 1-23, Published: US.
U.S. Patent and Trademark Office, File History from U.S. Appl. No. 15/436,605, 5691 Pages, Published: US.
State Intellectual Property Office, P.R. China, "Reexamination Decision Revoking Decision of Rejection from CN Application No. 200710153587.X dated Nov. 30, 2012", from Foreign Counterpart to U.S. Appl. No. 09/619,431, dated Nov. 30, 2012, pp. 1-14, Published: CN.
U.S. Patent and Trademark Office, "Interview Summary", U.S. Appl. No. 15/483,432, dated Mar. 26, 2018, pp. 1-12, Published: US.
State Intellectual Property Office of People's Republic of China, "First Office Action for CN Application No. 200910005002.9", "from Foreign Counterpart of U.S. Appl. No. 09/619,431", dated Apr. 6, 2012, pp. 1-12, Published in: CN.
European Patent Office, "Communication under Rule 71(3) EPC for EP Application No. 01950794.6", "from Foreign Counterpart of U.S. Appl. No. 09/619,431", dated May 3, 2011, pp. 1-5, Published in: EP.
European Patent Office, "Office Action EP Application No. 01950794.6", "from Foreign Counterpart of U.S. Appl. No. 09/619,431", dated Feb. 24, 2006, pp. 1-5, Published in: EP.
European Patent Office, "Office Action for EP Application No. 01950794.6", "from Foreign Counterpart of U.S. Appl. No. 09/619,431", dated Mar. 16, 2007, pp. 1-4, Published in: EP.
European Patent Office, "Office Action for EP Application No. 01950794.6", "from Foreign Counterpart of U.S. Appl. No. 09/619,431", dated Nov. 16, 2010, pp. 1-4, Published in: EP.
European Patent Office, "Summons to Attend Oral Proceedings for EP Application No. 01950794.6", "from Foreign Counterpart of U.S. Appl. No. 09/619,431", dated May 21, 2010, pp. 1-6, Published in: EP.
European Patent Office, "Extended European Search Report for EP Application No. 10011450.3", "from Foreign Counterpart of U.S. Appl. No. 09/619,431", dated Nov. 14, 2011, pp. 1-9, Published in: EP.
European Patent Office, "Communication under Rule 71(3) from European Application Serial No. 10011450.3", "from Foreign Counterpart to U.S. Appl. No. 09/619,431", dated Jul. 14, 2015, pp. 1-39, Published in: EP.
European Patent Office, "Communication under Rule 71(3) for EP Application No. 10011450.3", "from Foreign counterpart to U.S. Appl. No. 09/619,431", dated Jan. 26, 2016, pp. 1-37, Published in: EP.
European Patent Office, "European Office Action for Application Serial No. 10011450.3", "from Foreign counterpart of U.S. Appl. No. 09/619,431", dated Jan. 16, 2015, pp. 1-4, Published in: EP.
European Patent Office, "Extended European Search Report for EP Application No. 15020262.0", "from Foreign Counterpart to U.S. Application No. 09/619,431", dated May 20,2016, pp. 18, Published in: EP.
U.S. Patent and Trademark Office, "Notice of Allowance", "U.S. Appl. No. 09/619,431", dated Mar. 12, 2003, pp. 1-9, Published in: US.
U.S. Patent and Trademark Office, "Office Action", "U.S. Appl. No. 09/619,431", dated Mar. 13, 2003, pp. 1-15, Published in: US.
U.S. Patent and Trademark Office, "Final Office Action", "U.S. Appl. No. 10/740,944", dated Jan. 25, 2007, pp. 1-19, Published in: US.
U.S. Patent and Trademark Office, "Final Office Action", "U.S. Appl. No. 10/740,944", dated Jul. 18, 2007, pp. 1-21, Published in: US.
U.S. Patent and Trademark Office, "Final Office Action", "U.S. Appl. No. 10/740,944", dated Oct. 3, 2007, pp. 1-22, Published in: US.
U.S. Patent and Trademark Office, "Final Office Action", "U.S. Appl. No. 10/740,944", dated Oct. 14, 2008, pp. 1-25, Published in: US
U.S. Patent and Trademark Office, "Notice of Allowance", "U.S. Appl. No. 10/740,944", dated Mar. 13, 2009, pp. 1-12, Published in: US.
U.S. Patent and Trademark Office, "Office Action", "U.S. Appl. No. 10/740,944", dated Mar. 24, 2006, pp. 1-19, Published in: US.
U.S. Patent and Trademark Office, "Final Office Action", "U.S. Appl. No. 10/740,944", dated Feb. 5, 2007, pp. 1-16, Published in: US.
U.S. Patent and Trademark Office, "Office Action", "U.S. Appl. No. 10/740,944", dated Apr. 3, 2008, pp. 1-21, Published in: US.
U.S. Patent and Trademark Office, "Office Action", "U.S. Appl. No. 10/740,944", dated Feb. 27, 2009, pp. 1-25.
U.S. Patent and Trademark Office, "Notice of Allowance", "U.S. Appl. No. 12/617,215", dated Aug. 2, 2012, pp. 1-11, Published in: US.
U.S. Patent and Trademark Office, "Office Action", "U.S. Appl. No. 12/617,215", dated Apr. 11, 2012, pp. 1-12, Published in: US.
U.S. Patent and Trademark Office, "Notice of Allowance", "U.S. Appl. No. 13/662,948", dated Jul. 3, 2013, pp. 1-10, Published in: US.
U.S. Patent and Trademark Office, "Office Action", "from U.S. Appl. No. 13/662,948", dated Apr. 24, 2013, pp. 1-23, Published in: US.

(56) References Cited

OTHER PUBLICATIONS

U.S. Patent and Trademark Office, "Notice of Allowance", "from U.S. Appl. No. 14/054,223", dated Aug. 14, 2015, pp. 1-5, Published in: US.
U.S. Patent and Trademark Office, "Notice of Allowance", "from US. Appl. No. 14/054,223", dated Dec. 22, 2015, pp. 1-9, Published in: US.
U.S. Patent and Trademark Office, "Supplemental Notice of Allowability", "from U.S. Appl. No. 14/054,223", dated Apr. 11, 2016, pp. 1-4, Published in: US.
U.S. Patent and Trademark Office, "Office Action", "from U.S. Appl. No. 14/054,223", dated Apr. 29, 2015, pp. 1-25, Published in: US.
U.S. Patent and Trademark Office, "Final Office Action", "From U.S. Appl. No. 15/144,219", dated Oct. 30, 2017, pp. 1-33, Published in: US.
U.S. Patent and Trademark Office, "Notice of Allowance", "From U.S. Appl. No. 15/144,219", dated Nov. 28, 2016, pp. 1-5, Published in: US.
U.S. Patent and Trademark Office, "Office Action", "From U.S. Appl. No. 15/144,219", dated Aug. 10, 2016, pp. 1-35, Published in: US.
U.S. Patent and Trademark Office, "Office Action", "From U.S. Appl. No. 15/144,219", dated Apr. 28, 2017, pp. 1-24, Published in: US.
U.S. Patent and Trademark Office, "Office Action", "From U.S. Appl. No. 15/144,219", dated Apr. 25, 2018, pp. 1-38, Published in: US.
The International Bureau of WIPO, "International Preliminary Examination Report from PCT/US01/21021", "from PCT Counterpart of U.S. Appl. No. 09/619,431", dated Oct. 6, 2002, pp. 1-3, Published in: WO.
International Searching Authority, "International Search Report for PCT/US01/21021", "from Foreign Counterpart of U.S. Appl. No. 09/619,431", dated Nov. 15, 2001, pp. 1-7, Published in: WO.
International Search Authority, "Written Opinion for PCT/US01/21021", "from Foreign Counterpart of U.S. Appl. No. 09/619,431", dated Mar. 18, 2002, pp. 1-2, Published in: WO.
China Patent Office, "Notification of Grant Patent Right for Invention from CN200380109396.3", "from Chinese Counterpart of U.S. Appl. No. 10/395,743", dated Jun. 29, 2010, pp. 1-4, Published in: CN.
China Patent Office, "First Office Action from CN200380109396.3", "from Chinese Counterpart of U.S. Appl. No. 10/395,743", dated Jan. 4, 2008, pp. 1-7, Published in: CN.
European Patent Office, "Office Action for EP Application No. 03790242.6", "from Foreign Counterpart of U.S. Appl. No. 10/395,743", dated Feb. 11, 2009, pp. 1-4, Published in: EP.
Korean Intellectual Property Office, "Decision to Grant from KR2005-7010190", "from Foreign Counterpart to U.S. Appl. No. 10/395,743", dated Feb. 2, 2012, pp. 1-7, Published in: KR.
Korean Patent Office, "Office Action from KR2005-7010190", "from Foreign Counterpart to U.S. Appl. No. 10/395,743", dated Sep. 30, 2010, pp. 1-5, Published in: KR.
Korean Patent Office, "Final Rejection from KR2005-7010190", "from Korean Counterpart to U.S. Appl. No. 10/395,743", dated Oct. 31, 2011, pp. 1-3, Published in: KR.
U.S. Patent and Trademark Office, "Final Office Action", "From U.S. Appl. No. 10/395,743", dated Nov. 17, 2008, pp. 1-15, Published in: US.
U.S. Patent and Trademark Office, "Final Office Action", "From U.S. Appl. No. 10/395,743", dated Aug. 20, 2009, pp. 1-22, Published in: US.
U.S. Patent and Trademark Office, "Final Office Action", "From U.S. Appl. No. 10/395,743", dated Jul. 21, 2010, pp. 1-23, Published in: US.
U.S. Patent and Trademark Office, "Notice of Allowance", "From U.S. Appl. No. 10/395,743", dated Jun. 4, 2014, pp. 1-5, Published in: US.
U.S. Patent and Trademark Office, "Notice of Allowance", "From U.S. Appl. No. 10/395,743", dated Sep. 12, 2014, pp. 1-25, Published in: US.
U.S. Patent and Trademark Office, "Office Action", "From U.S. Appl. No. 10/395,743", dated Mar. 28, 2005, pp. 1-11, Published in: US.
U.S. Patent and Trademark Office, "Office Action", "From U.S. Appl. No. 10/395,743", dated Jan. 30, 2006, pp. 1-15, Published in: US.
U.S. Patent and Trademark Office, "Office Action", "From U.S. Appl. No. 10/395,743", dated Sep. 1, 2006, pp. 1-12, Published in: US.
U.S. Patent and Trademark Office, "Office Action", "From U.S. Appl. No. 10/395,743", dated Nov. 15, 2007, pp. 1-16, Published in: US.
U.S. Patent and Trademark Office, "Office Action", "From U.S. Appl. No. 10/395,743", dated Jan. 4, 2007, pp. 1-11, Published in: US.
U.S. Patent and Trademark Office, "Office Action", "From U.S. Appl. No. 10/395,743", dated May 21, 2008, pp. 1-14, Published in: US.
U.S. Patent and Trademark Office, "Office Action", "From U.S. Appl. No. 10/395,743", dated Jan. 14, 2010, pp. 1-31, Published in: US.
The International Bureau of WIPO, "International Preliminary Report on Patentability from Application No. PCT/US03/38302", "from PCT Counterpart of U.S. Appl. No. 10/395,743", dated Dec. 14, 2011, pp. 1-10, Published in: WO.
Brazilian National Institute of Industrial Property, "Technical Examination Report for BR Application No. PI0112653-9", from Foreign Counterpart to U.S. Appl. No. 09/619,431, dated Apr. 17, 2018, p. 1-6, Published in: BR.
The International Bureau of WIPO, "International Search Report from PCT/US03/38302", "from PCT Counterpart of U.S. Appl. No. 10/395,743", dated May 2, 2005, pp. 1-5, Published in: WO.
Wala, "A New Microcell Architecture Using Digital Optical Transport, Freedom Through Wireless Technology", dated Jun. 18, 1993, pp. 585-588, Publisher: Proceedings of the Vehicular Technology Conference, New York, IEEE, Published in: US.
Lee et al., "Intelligent Microcell Applications in PCS", "43rd IEEE Vehicular Technology Conference, Personal Communication—Freedom Through Wireless Technology", May 18, 1993, pp. 722-725, Publisher: Pactel Corporation, Published in: Secaucus, NJ.
ADC Kentrox, "CityCell 824, Remote-Site Manual", "Preliminary Version", Feb. 1, 1993, pp. 1-105, Publisher: ADC Kentrox.
Lewis, "ADC-Kentrox Call Report With Bell Atlantic", Oct. 18, 1992, pp. 1-3.
ADC Kentrox, "Wireless Systems Group Citycell 824—A Positioning White Paper", Mar. 1993, pp. 1-6, Publisher: Cita Trade Show.
"Photographs of ADC Kentrox City Cell 824 Components; Publication Date Unknown", , pp. 1-14.
"Widen Your Horizons to a World of Solutions We're Wherever in the World You Need Us to Be.", "ADC Telecommunications, Inc. Advertisement for CityRad Cell Enhancer, CityCell Digital Fiberoptic Microcell, CitySmart Site Diversity System & CityWide", 1994, pp. 1-8, Publisher: ADC Telecommunications, Inc.
Akos et al, "Direct Bandpass Sampling of Multiple Distinct RF Signals", "Transactions on communications", Jul. 1, 1999, pp. 983-988, vol. 47, No. 7, Publisher IEEE.
Ameritech, "Broadband Optical Transport Digital Microcell Connection Service—Interface and Performance Specifications", Dec. 1993, Page(s) Cover—26, No. 1, Publisher: Ameritech.
Analog Devices, Inc., "Mixed-Signal Design Seminar", 1991, pp. 1-3, Publisher: Analog Devices, Inc.
Anaren, "Anaren Microwave Components", , pp. 1-7.
"And Now a Few Words From Your Customers . . . ", Aug. 1, 1992, pp. 1-4, Publisher: ADC Kentrox, Published in: Portland, OR.
Anon, "2 GHz Repeater Built Without I-F", "Microwaves", Jun. 1976, p. 16, vol. 15, No. 6, Publisher: Hayden Publishing Company Inc.
Brunner et al., "On Space-Time Rake Receiver Structures for WCDMA", Oct. 1999, pp. 1546-1551, Publisher: IEEE.

(56) References Cited

OTHER PUBLICATIONS

Cheun, "Performance of Direct-Sequence Spread-Spectrum Rake Receivers with Random Spreading Sequences", "IEEE Transactions on Communications", Sep. 1997, pp. 1130-1143, vol. 45, No. 9, Publisher: IEEE.
City Cell, "ADC Kentrox Introduces Citycell 824, A Replacement for Conventional Cell Sites", "Telocator Bulletin", Feb. 1993, p. 1, Publisher: ADC Kentrox.
The Day Group, "New Signal Transport Technology Digitizes the Cellular Band", "Cellular Industry", , pp. 1-2, Publisher: City Cell.
"CityCell 824 Host-Site User Manual", Sep. 25, 1993, pp. 1-108.
Cellular Industry, "ADC Kentrox Citycell Field Trial Yields Another First—Simultaneous Analog and Digital Calls", "City Cell", Dec. 22, 2000, p. 1.
Dali Wireless, Inc.'S Preliminary Invalidity Contentions to Commscope Technologies LLC, "*Commscope Technologies LLC* V. *Dali Wireless, INC.* V. *Commscope Connectivity LLC*", "United States District Court for the Northern District of Texas Dallas Division", Mar. 13, 2017, pp. 1-23, No. 3:16-cv-477, Published in: US.
Dali Wireless, Inc.'s Preliminary Invalidity Contentions to Commscope Technologies LLC—Exhibit A, "*Commscope Technologies LLC* V. *Dali Wireless, Inc.* V. *Commscope Connectivity LLC*", "United States District Court for the Northern District of Texas Dallas Division", Mar. 13, 2017, pp. 1-27, No. 3:16-cv-477, Published in: US.
Dali Wireless, Inc.'s Preliminary Invalidity Contentions to Commscope Technologies LLC—Exhibit B, "*Commscope Technologies LLC* V. *Dali Wireless, Inc.* V. *Commscope Connectivity LLC*", "United States District Court for the Northern District of Texas Dallas Division", Mar. 13, 2017, pp. 1-200, No. 3:16-cv-477, Published in: US.
Dali Wireless, Inc.'s Preliminary Invalidity Contentions to Commscope Technologies LLC—Exhibit C, "*Commscope Technologies LLC* V. *Dali Wireless, Inc.* V. *Commscope Connectivity LLC*", "United States District Court for the Northern District of Texas Dallas Division", Mar. 13, 2017, pp. 1-410, No. 3:16-cv-477, Published in: US.
Dali Wireless, Inc.'s Preliminary Invalidity Contentions to Commscope Technologies LLC—Exhibit D, "*Commscope Technologies LLC* V. *Dali Wireless, Inc.* V. *Commscope Connectivity LLC*", "United States District Court for the Northern District of Texas Dallas Division", Mar. 13, 2017, pp. 1-613, No. 3:16-cv-477, Published in: US.
Dali Wireless, Inc.'s Preliminary Invalidity Contentions to Commscope Technologies LLC—Exhibit E, "*Commscope Technologies LLC* V. *Dali Wireless, Inc.* V. *Commscope Connectivity LLC*", "United States District Court for the Northern District of Texas Dallas Division", Mar. 13, 2017, pp. 1-482, No. 3:16-cv-477, Published in: US.
Dali Wireless, Inc.'s Preliminary Invalidity Contentions to Commscope Technologies LLC—Exhibit F, "*Commscope Technologies LLC* V. *Dali Wireless, Inc.* V. *Commscope Connectivity LLC*", "United States District Court for the Northern District of Texas Dallas Division", Mar. 13, 2017, pp. 1-573, No. 3:16-cv-477, Published in: US.
Crofut, "Remote Monitoring of Wireless Base Stations", "http://urgentcomm.com/print/mag/remote-monitoring-wireless-base-stations", Jun. 1, 1998, pp. 1-4.
Cyr et al., "The Digital Age is Here—Digital Radio Frequency Transport Enhances Cellular Network Performance", "Telephony", Jul. 5, 1993, pp. 20-24.
Payne et al., "Single Mode Optical Local Networks", "GLOBECOM '85", Dec. 5, 1985, pp. 1200-1206, Publisher: IEEE Global Telecommunications Conference.
Horowitz, "Digital Electronics Chapter 8: Basic Logic Concepts", "The Art of Electronics", 1980, p. 316 Publisher: Press Syndicate of the University of Cambridge.
Cox, "A Radio System Proposal for Widespread Low-Power Tetherless Communications", "IEEE Transactions on Communications", Feb. 1991, pp. 324-335, vol. 39, No. 2, Publisher: IEEE.
IEE, "Electronics Letters an International Publication", Nov. 19, 1987, pp. 1-4, vol. 23, No. 24, Publisher: The Institution of Electrical Engineers.
ADC Kentrox, "ADC Kentrox Expands RF Technology Base with Acquisition of Waseca Technology Inc.", "ADC Kentrox New Release", Jun. 9, 1993, pp. 1-2.
Siala et al., "Equalization for Orthogonal Frequency Division Multiplexing System", 1993, pp. 649-652, Publisher: IEEE, Published in: New York, NY.
ADC Kentrox, "ADC Kentrox Introduces Citycell 824, A Replacement for Conventional Cell Sites; Company's Original Goal Was to Improve Fiber Optic T1 Links Between Cells, MTSOs", "Telocator Bulletin", Feb. 1993, p. 1, Publisher: CityCell.
ADC Kentrox, "First Field Trial Results Exceed Expectations ADC Kentrox and Cellular One Join Force to Provide a New Level of Portable Service", Mar. 2, 1993, pp. 1-2, Publisher: ADC Kentrox, Published in: Portland, OR.
Foxcom Wireless Properietary Information, "Litenna In-Building RF Distribution System", 1998, pp. 1-8, Publisher: Foxcom Wireless Ltd.
U.S. Patent and Trademark Office, "Final Office Action", U.S. Appl. No. 15/483,432, dated Jun. 4, 2018, pp. 1-88, Published in: US.
1998 Foxcom Wireless Proprietary Information, "Application Note: RFiber-RF Fiberoptic Links for Wireless Applications", "RFiber Application Book", 1998, pp. 3-11, Published in: US.
Wikipedia, "Global System for Mobile Communications", Jan. 9, 2019, pp. 1-24, Wikipedia.
Annex WRST 14 to the Nullity Action 114950NI934 PL/lf against EP 2290850 dated Apr. 3, 2019, pp. 1-50.
Annex WRST 16 to the Nullity Action 114951NI934/lf against EP 1570626 dated Jan. 7, 2019, pp. 1-53.
Annex WRST 2 to the Nullity Action 114950NI934 PL/lf against EP 2290850 dated Apr. 3, 2019, pp. 1-4.
Annex WRST 2 to the Nullity Action 114951NI934/lf against EP 1570626 dated Jan. 7, 2019, pp. 1-4.
Annex WRST 3 to the Nullity Action 114950NI934 PL/lf against EP 2290850 dated Apr. 3, 2019, pp. 1-2.
Annex WRST 3 to the Nullity Action 114951NI934/lf against EP 1570626 dated Jan. 7, 2019, pp. 1-3.
Annex WRST 4 to the Nullity Action 114950NI934 PL/lf against EP 2290850 dated Apr. 3, 2019, pp. 1-6.
CommScope, "CommScope Completes Transformational Acquisition of TE Connectivity's Telecom, Enterprise and Wireless Businesses", Aug. 28, 2015, pp. 1-4.
Jury Verdict, "*CommScope Technologies LLC* V. *Dali Wireless, Inc.* v. *CommScope Connectivity LLC*", No. 3:16-cv-477, "United States District Court for the Northern District of Texas Dallas Division", Jun. 20, 2019, pp. 1-19, Published in: US.
Nullity Action 114950NI934 PL/lf against EP 2290850 dated Apr. 3, 2019, pp. 1-107.
Nullity Action 114951NI934 PL/lf against EP 1570626 dated Jan. 7, 2019, pp. 1-122.
TE Connectivity, "Innovative Solution to Cut Costs of Delivering Mobile Ultra-broadband Access", Feb. 20, 2014, pp. 1-4.
Wikipedia, "Summation", Dec. 18, 2018, pp. 1-11, Wikipedia.
Wikipedia, "T-carrier", Oct. 21, 2018, pp. 1-6, Wikipedia.
Tang, "Fiber Optic Antenna Remoting for Multi-Sector Cellular Cell Sites", GTE Laboratories, at least as early as Jul. 9, 1993, pp. 1-22.
U.S. Patent and Trademark Office, "Final Office Action", U.S. Appl. No. 10/395,743, dated Sep. 1, 2006, pp. 1-12, Published: US.
International Preliminary Examining Authority, "International Preliminary Examination Report from PCT Application No. PCT/US01/21021 dated Jun. 10, 2002", from Foreign Counterpart to U.S. Appl. No. 09/619,431, pp. 1-3, Published: WO.
U.S. Patent and Trademark Office, "Notice of Allowance", U.S. Appl. No. 15/144,219, dated Jul. 17, 2019, pp. 1-13, Published: US.
U.S. Patent and Trademark Office, "Notice of Allowance", U.S. Appl. No. 15/483,432, dated Jul. 16, 2019, pp. 1-7, Published: US.
Derneryd et al., "Adaptive base-station antenna arrays", Ericsson Review No. 3, 1999, pp. 132-137.
Federal Patent Court, "Statement of Reply including Annexes MB1 and MB2 in the Nullity Action from EP Application No. 2290850

(56) References Cited

OTHER PUBLICATIONS mailed Sep. 13, 2019", from Foreign Counterpart to U.S. Appl. No. 09/619,431, pp. 1-149, Published: DE.
Federal Patent Court, "Statement of Reply including Annex MB1 in the Nullity Action from EP Patent No. 1570626 mailed Jul. 31, 2019", from Foreign Counterpart to U.S. Appl. No. 10/395,743, pp. 1-57, Published: DE.
Annex WRST 17 to the Replica to the Nullity Action 114951NI934/lf against EP 1570626 dated Oct. 14, 2019, pp. 1-4.
Annex WRST 18 to the Replica to the Nullity Action 114951NI934/lf against EP 1570626 dated Oct. 14, 2019, pp. 1-6.
Replica to the Nullity Action 114951NI934/lf against EP 1570626 dated Oct. 14, 2019, pp. 1-49.
U.S. Patent and Trademark Office, File History from U.S. Appl. No. 10/395,743, 2417 Pages, Published: US.
Federal Patent Court, "Replica to the invalidity matter 6Ni21/19 against EP 2290850 dated Dec. 20, 2019", pp. 1-53, Published: DE.
German Federal Patent Court, "SOLid Inc.'s Nullity Action from EP Patent No. 1570626", from Foreign Counterpart to U.S. Appl. No. 10/395,743, filed May 11, 2021, pp. 1 through 114, Published: DE.
Wikipedia, "Uplink", May 10, 2019, pp. 1 through 6, https://de.wikipedia.org/w/index.php?title=Uplink&oldid=188425198.
High Court of Justice Business and Property Courts of England and Wales Intellectual Property List (ChD) Patent Court, Case No. HP-2020-000017, "Exhibit AA-1 to the First Expert Report of Dr Anthony Acampora", Oct. 22, 2021, pp. C2-2 through C2-46, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-2 to the First Expert Report of Dr Anthony Acampora", Oct. 22, 2021, pp. C2-47 through C2-50, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-3 to the First Expert Report of Dr Anthony Acampora", Oct. 22, 2021, pp. C2-51 through C2-62, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-4 to the First Expert Report of Dr Anthony Acampora", Oct. 22, 2021, pp. C2-63 through C2-70, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-5 to the First Expert Report of Dr Anthony Acampora", Oct. 22, 2021, pp. C2-71 through C2-75, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-6 to the First Expert Report of Dr Anthony Acampora", Oct. 22, 2021, pp. C2-76 through C2-82, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-7 to the First Expert Report of Dr Anthony Acampora", Oct. 22, 2021, pp. C2-83 through C2-87, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-8 to the First Expert Report of Dr Anthony Acampora", Oct. 22, 2021, pp. C2-88 through C2-96, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-9 to the Second Expert Report of Dr Anthony Acampora", Nov. 12, 2021, pp. C2-97 through C2-122, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "First Expert Report of Professor Alwyn John Seeds", Oct. 22, 2021, pp. D1-2 through D1-51, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Third Expert Report of Professor Alwyn John Seeds", Nov. 22, 2021, pp. D1-73 through D1-82, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-1 to the First Expert Report of Professor Alwyn John Seeds", Oct. 22, 2021, pp. D2-2 through D2-5, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-2 to the First Expert Report of Professor Alwyn John Seeds", Oct. 22, 2021, pp. D2-6 through D2-53, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-3 to the First Expert Report of Professor Alwyn John Seeds", Oct. 22, 2021, pp. D2-54 through D2-79, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-4 to the First Expert Report of Professor Alwyn John Seeds", Oct. 22, 2021, pp. D2-80 through D2-92, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-5 to the First Expert Report of Professor Alwyn John Seeds", Oct. 22, 2021, pp. D2-93 through D2-108, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-6 to the First Expert Report of Professor Alwyn John Seeds", Oct. 22, 2021, pp. D2-109 through D2-110, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-7 to the First Expert Report of Professor Alwyn John Seeds", Oct. 22, 2021, pp. D2-111 through D2-112, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-8 to the First Expert Report of Professor Alwyn John Seeds", Oct. 22, 2021, pp. D2-113 through D2-114, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-9 to the First Expert Report of Professor Alwyn John Seeds", Oct. 22, 2021, pp. D2-115 through

(56) References Cited

OTHER PUBLICATIONS

D2-116, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-10 to the First Expert Report of Professor Alwyn John Seeds", Oct. 22, 2021, pp. D2-117 through D2-118, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-11 to the First Expert Report of Professor Alwyn John Seeds", Oct. 22, 2021, pp. D2-119 through D2-120, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-12 to the First Expert Report of Professor Alwyn John Seeds", Oct. 22, 2021, pp. D2-121 through D2-122, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-15 to the Third Expert Report of Professor Alwyn John Seeds", Nov. 22, 2021, pp. D2-142 through D2-153, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-16 to the Third Expert Report of Professor Alwyn John Seeds", Nov. 22, 2021, pp. D2-154 through D2-160, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-17 to the Third Expert Report of Professor Alwyn John Seeds", Nov. 22, 2021, pp. D2-161 through D2-170, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-18 to the Third Expert Report of Professor Alwyn John Seeds", Nov. 22, 2021, pp. D2-171 through D2-175, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-19 to the Third Expert Report of Professor Alwyn John Seeds", Nov. 22, 2021, pp. D2-176 through D2-179, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-20 to the Third Expert Report of Professor Alwyn John Seeds", Nov. 22, 2021, pp. D2-180 through D2-189, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-21 to the Third Expert Report of Professor Alwyn John Seeds", Nov. 22, 2021, pp. D2-190 through D2-200, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-22 to the Third Expert Report of Professor Alwyn John Seeds", Nov. 22, 2021, pp. D2-201 through D2-206, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-23 to the Third Expert Report of Professor Alwyn John Seeds", Nov. 22, 2021, pp. D2-207 through D2-235, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Proceedings Day 1", Dec. 7, 2021, pp. T/2 through T/48, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Proceedings Day 2", Dec. 8, 2021, pp. T/54 through T/99, Re: EP(UK) 2 290 850 and EP(UK) 1 570 626 issued from Foreign Counterparts to U.S. Appl. Nos. U.S. Appl. No. 09/619,431 and U.S. Appl. No. 10/395,743.
High Court of Justice Business and Property Courts of England and Wales Intellectual Property List (ChD) Patent Court, Case No. HP-2020-000017, "Proceedings Day 3", Dec. 9, 2021, pp. T/109 through T/162, Re: EP(UK) 2 290 850 and EP(UK) 1 570 626 issued from Foreign Counterparts to U.S. Appl. Nos. U.S. Appl. No. 09/619,431 and U.S. Appl. No. 10/395,743.
High Court of Justice Business and Property Courts of England and Wales Intellectual Property List (ChD) Patent Court, Case No. HP-2020-000017, "Proceedings Day 4", Dec. 14, 2021, pp. 1 through 53, Re: EP(UK) 2 290 850 and EP(UK) 1 570 626 issued from Foreign Counterparts to U.S Application Nos. U.S. Appl. No. 09/619,431 and U.S. Appl. No. 10/395,743.
High Court of Justice Business and Property Courts of England and Wales Intellectual Property List (ChD) Patent Court, Case No. HP-2020-000017, Documents Provided by the Defendant for Cross Examination—XX-AA1, including Butterweck et al., "Finite wordlength effects in digital filters: a review", Jan. 31, 1988, EUT report. E, Fac. of Electrical Engineering; vol. 88-E-205, Eindhoven University of Technology, Netherlands, pp. XX-AA/2 through XX-AA/99, Re: EP(UK) 2 290 850 and EP(UK) 1 570 626.
High Court of Justice Business and Property Courts of England and Wales Intellectual Property List (ChD) Patent Court, Case No. HP-2020-000017, Documents Provided by the Defendant for Cross Examination—XX-AA2, including Acampora, "An Introduction to Broadband Networks, LANs, Mans, ATM, B-ISDN, and Optical Networks for Integrated Multimedia Telecommunications", (c) 1994 Springer Science+Business Media New York, pp. XX-AA/100 through XX-AA/108, Re: EP(UK) 2 290 850 and EP(UK) 1 570 626.
High Court of Justice Business and Property Courts of England and Wales Intellectual Property List (ChD) Patent Court, Case No. HP-2020-000017, Documents Provided by the Defendant for Cross Examination—XX-AA3, including European Patent Application Publication EP 0 664 621 A1, Jul. 26, 1995, pp. XX-AA/109 through XX-AA/125, Re: EP(UK) 2 290 850 and EP(UK) 1 570 626 issued from Foreign Counterparts to U.S. Appl. Nos. 09/619,431 and U.S. Appl. No. 10/395,743.
High Court of Justice Business and Property Courts of England and Wales Intellectual Property List (ChD) Patent Court, Case No. HP-2020-000017, Documents Provided by the Defendant for Cross Examination—XX-AA4, including Gregson, "LCG Gains Patent on LGCell Antenna" RCR Wireless News, 34/13/1998, p. XX-AA/126, Re: EP(UK) 2 290 850 and EP(UK) 1 570 626 issued from Foreign Counterparts to U.S. Appl. Nos. 09/619,431 and U.S. Appl. No. 10/395,743.
High Court of Justice Business and Property Courts of England and Wales Intellectual Property List (ChD) Patent Court, Case No. HP-2020-000017, Documents Provided by the Defendant for Cross Examination—XX-AA5, Dagoni, "The lobbyist, the US Representative, and the Israeli Company", Globes, Oct. 20, 2005, pp. XX-AA/127 through XX-AA/130, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No.

(56) References Cited

OTHER PUBLICATIONS

HP-2020-000017, Documents Provided by the Defendant for Cross Examination—XX-AA6, including annotated U.S. Pat. No. 7,848,747 B2, Dec. 7, 2010, pp. XX-AA/131 through XX-AA/138, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA7, WDD, "Designing Distributed Antenna Systems (DAS) Considerations, challenges, and what to expect when designing and deploying DAS.", (c) 2016, Advantage Business Media, pp. XX-AA/139 through XX-AA/153, Re: EP(UK) 2 290 850 and EP(UK) 1 570 626.
High Court of Justice Business and Property Courts of England and Wales Intellectual Property List (ChD) Patent Court, Case No. HP-2020-000017, Documents Provided by the Defendant for Cross Examination—XX-AA8, including U.S. Pat. No. 9,332,402 B2, May 3, 2016, pp. XX-AA/154 through XX-AA/172, Re: EP(UK) 2 290 850 and EP(UK) 1 570 626 issued from Foreign Counterparts to U.S. Appl. Nos. 09/619,431 and 10/395,743.
U.S. Patent and Trademark Office, "Notice of Filing Date Accorded to Petition and Time for Filing Patent Owner Preliminary Response", U.S. Pat. No. 7,639,982, dated Aug. 18, 2021, pp. 1 through 5.
High Court of Justice Business and Property Courts of England and Wales Intellectual Property List (ChD) Patent Court, Case No. HP-2020-000017, "Indexes", pp. 1 through 14, Re: EP(UK) 2 290 850 and EP(UK) 1 570 626 issued from Foreign Counterparts to U.S Appl. Nos. 09/619,431 and 10/395,743.
High Court of Justice Business and Property Courts of England and Wales Intellectual Property List (ChD) Patent Court, Case No. HP-2020-000017, "Approved Judgment", Apr. 1, 2021, pp. 1 through 64, Re: EP(UK) 2 290 850 and EP(UK) 1 570 626 issued from Foreign Counterparts to U.S Appl. Nos. 09/619,431 and 10/395,743.
High Court of Justice Business and Property Courts of England and Wales Intellectual Property List (ChD) Patent Court, Case No. HP-2020-000017, "Application Notice", Sep. 1, 2021, pp. A2/49 through A2/52, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Statement of Reasons for Amendment of EP (UK) 2290850 B1", pp. A2/53 through A2/60, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Notice and Statement of Grounds of Opposition", Oct. 12, 2021, pp. A2/61 through A2/64, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Comptroller Comments", Oct. 26, 2021, pp. A2/65 through A2/68, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Application Notice", Sep. 1, 2021, pp. A3-83 through A3-86, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Amended Statement of Reasons for Amendment of EP(UK) 1,570,626 B1", pp. A3-87 through A3-92, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Annex D to the First Expert Report of Dr Anthony Acampora", Oct. 22, 2021, pp. A3-93 through A3-105, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Comptroller Comments re: EP(UK) 1 570 626 31", Oct. 26, 2021, pp. A3/106 through A3/109, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Application Notice", pp. A3/110 through A3/112, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Fourth Expert Report of Dr Anthony Acampora", Dec. 1, 2021, pp. A3-113 through A3-116, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Amended Claim Form by Order of Mr Justice Meade dated Jul. 23, 2021", pp. B1/2 through B1/3, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Amended Particulars of Claim by Order of Mr Justice Meade dated Jul. 23, 2021", Aug. 6, 2021, pp. B1/4 through B1/6, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Amended Particulars of Infringement by Drder of Mr Justice Meade dated Jul. 23, 2021", Aug. 6, 2021, pp. B1/7 through B1/12, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Amended Defence and Amended Counterclaim", Aug. 20, 2021, pp. B1/13 through B1/22, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 5", pp. 33/49 through B3/53, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 6", pp. 33/54 through B3/61, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 7", pp. 33/62 through B3/64, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 8", pp. B3/65 through B3/66, Re: EP(UK) 2 290 850 and EP(UK) 1 570 626 issued from Foreign Counterparts to U.S. Appl. Nos. 09/619,431 and 10/395,743.

(56) References Cited

OTHER PUBLICATIONS

High Court of Justice Business and Property Courts of England and Wales Intellectual Property List (ChD) Patent Court, Case No. HP-2020-000017, "Particulars of Infringement Annex 9", pp. B3/67 through B3/68, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Defence and Counterclaim Annex 1", pp. B3/70 through B3/193, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Defence and Counterclaim Annex 2", pp. B3/194 through B3/261, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Defence and Counterclaim Annex 3", pp. B3/262 through B3/266, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Annex 1 to the Reply and Defence to Counterclaim", pp. B3/267 through B3/272, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Annex 2 to the Reply and Defence to Counterclaim", pp. B3/273 through B3/281, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Annex 3 to the Reply and Defence to Counterclaim", pp. B2/282 through B2/289, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "First Expert Report of Dr Anthony Acampora", Oct. 22, 21, pp. C1-2 through C1-65, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Annex A to the First Expert Report of Dr Anthony Acampora Supplemented Technical Primer", Oct. 22, 21, pp. C1-66 through C1-90, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Second Expert Report of Dr Anthony Acampora", Nov. 12, 2021, pp. C1-94 through C1-111, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Third Expert Report of Dr Anthony Acampora", Nov. 25, 2021, p. C1-112 through C1-119 , Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA9, OFCOM, "Citizens' Band (CB) radio spectrum use—information and operation", Mar. 2018, pp. XX-AA/173 through XX-AA/181, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA11, Dukda, "Introduction to Structured Cabling", Division of Information Technology, Ministry of Communication, Sep. 2000, pp. XX-AA/573 through XX-AA/600, Re: EP(UK) 2 290 850 and EP (UK) 1 570 626 issued from Foreign Counterparts to U.S Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA12, cleeCOMcen, "History of CV Radio", downloaded Dec. 1, 2021 from www.cleecomcen.co.uk/history-of-cb-radio/, pp. XX-AA/601 through XX-AA/605, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA13, Ghayas, "What Frequency Was Used by IS-95 (CdmaONE)?", downloaded Apr. 12, 2021 from https://commsbrief.com/what-frequency-was-used-by-cdmaone/, pp. XX-AA/606 through XX-AA/612, Re: EP(UK) 2 290 850 and EP(UK) 1 570 626.
High Court of Justice Business and Property Courts of England and Wales Intellectual Property List (ChD) Patent Court, Case No. HP-2020-000017, Documents Provided by the Defendant for Cross Examination—XX-AA14, Wireless Networks Online, "LGCell(TM) Wireless Network System", downloaded Nov. 19, 2021 from https://www.wirelessnetworksonline.com/doc/lgcell-wireless-network-system-0004, p. XX-AA/613, Re: EP(UK) 2 290 850 and EP(UK) 1 570 626.
High Court of Justice Business and Property Courts of England and Wales Intellectual Property List (ChD) Patent Court, Case No. HP-2020-000017, Documents Provided by the Defendant for Cross Examination—XX-AA16, "4 x 200 KHz Sub Chanels", p. XX-AA/615, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Claimant for Cross Examination—XX-AJS-1, "Oh Forward Path", p. XX-AJS/2, Re: EP(UK) 2 290 850 and EP(UK) 1 570 626 Bsued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Claimant for Cross Examination—XX-AJS-2, Al-Rawshidy et al., "Radio over Fiber Technologies for Mobile Communication Networks", May 9, 2002, (c) 2002 Artech House, Inc. Page(s) XX-AJS/3 through XX-AJS/60, Re: EP(UK) 2 290 850 and EP(UK) 1 570 626 issued from Foreign Counterparts to U.S Appl. Nos. 09/619,431 and 10/395,743.
High Court of Justice Business and Property Courts of England and Wales Intellectual Property List (ChD) Patent Court, Case No. HP-2020-000017, Documents Provided by the Claimant for Cross Examination—XX-AJS-3, including European Patent EP 1 334 630 B1, Sep. 22, 2004, pp. XX-AJS/62 through XX-AJS/75, Re: EP(UK) 2 290 850 and EP(UK) 1 570 626 issued from Foreign Counterparts to U.S. Appl. Nos. 09/619,431 and 10/395,743.
German Federal Patent Court, Docket No. 4 Ni 35/21 (EP), "Grounds for Objection to SOLiD Inc.'s Nullity Action from EP Patent No. 1 570 626 (DE 603 45 256)", Sep. 14, 2021, pp. 1 through 112, from Foreign Counterpart to U.S. Appl. No. 09/619,431.
Haas et al., "A Mode-Filtering Scheme for Improvement of the Bandwidth-Distance Product in Multimode Fiber Systems", Journal of Lightwave Technology, vol. 11, No. 7, Jul. 1993, pp. 1125 through 1131.

(56) References Cited

OTHER PUBLICATIONS

Ishida et al., "A10-GHz 8-b Multiplexer/Demultiplexer Chip Set for the Sonet STS-192 System", IEEE Journal of Solid State Circuits, vol. 26, No. 12, Dec. 1991, pp. Cover through 1943.
U.S. District Court for the Northern District of Texas Dallas Division, Rebuttal Expert Report of Dr. Anthony Acampora Addressing Validity of CommScope's Asserted Patents, including U.S. Pat. Nos. 9,332,402 (the '402 patent); 8,577,286 (the '286 patent); 8,326,218 (the '218 patent); 7,639,982 (the '982 patent); and 7,848,747 ("the 747 patent"), in *CommScope Technologies* v. *SOLiD Gear, Inc. and SOLiD, Inc.*, Case 3:16-cv-00477-M, 46 Pages, Re: U.S Appl. Nos. 14/054,223, 14/054,223, 14/054,223, and 14/054,223.
U.S. District Court for the Northern District of Texas, "Complaint for Patent Infringement", in *CommScope Technologies* v. *SOLiD Gear, Inc. and SOLiD, Inc.*, Case 3:16-cv-00477-M, May 18, 2022, pp. 1 through 32, Re: U.S. Pat. Nos. 7,639,982; 8,326,218; 8,877,286; and 9,332,402 from U.S. Appl. Nos. 10/740,944, 12/617,215, 13/662,948, and 14/054,223.
USPTO Patent Trial and Appeal Board, "Decision Settlement Prior to Institution of Trial" in *SOLiD, Inc.* v. *CommScope Technologies LLC* Inter Partes Review, IPR No. 2021-01394, Nov. 22, 2021, pp. 1 through 5, Re: U.S. Pat. No. 9,332,402, From U.S. Appl. No. 14/054,223.
USPTO Patent Trial and Appeal Board, "Decision Settlement Prior to Institution of Trial" in *SOLiD, Inc.* v. *CommScope Technologies LLC* Inter Partes Review, IPR No. 2021-01390, Nov. 22, 2021, pp. 1 through 5, Re: U.S. Pat. No. 7,639,982, From U.S. Appl. No. 10/740,944.
USPTO Patent Trial and Appeal Board, "Decision Settlement Prior to Institution of Trial" in *SOLiD, Inc.* v. *CommScope Technologies LLC* Inter Partes Review, IPR No. 2021-01391, Nov. 22, 2021, pp. 1 through 5, Re: U.S. Pat. No. 7,639,982, From U.S. Appl. No. 10/740,944.
USPTO Patent Trial and Appeal Board, "Decision Settlement Prior to Institution of Trial" in *SOLiD, Inc.* v. *CommScope Technologies LLC* Inter Partes Review, IPR No. 2021-01392, Nov. 22, 2021, pp. 1 through 5, Re: U.S. Pat. No. 8,326,218, From U.S. Appl. No. 12/617,215.
USPTO Patent Trial and Appeal Board, "Decision Settlement Prior to Institution of Trial" in *SOLiD, Inc.* v. *CommScope Technologies LLC* Inter Partes Review, IPR No. 2021-01393, Nov. 22, 2021, pp. 1 through 5, Re: U.S. Pat. No. 8,577,286, From U.S. Appl. No. 13/662,948.
USPTO Patent Trial and Appeal Board, "Declaration of Maria P. Garcia Under 37 C.F.R. § 1.68" in *SOLiD, Inc.* v. *CommScope Technologies LLC* Inter Partes Review, IPR Nos. 2021-01390, 2021-01391, 2021-01392, 2021-01393, 2021-01394, Oct. 6, 2020, 72 Pages, Re: U.S. Pat. Nos. 7,639,982, 8,326,218, 8,577,286, and 9,332,402 from U.S Appl. Nos. 10/740,944, 12/617,215, 13/662,948, and 14/054,223.
USPTO Patent Trial and Appeal Board, "Declaration of R. Jacob Baker, Ph.D. P.E Under 37 C.F.R. § 42.100" in *SOLiD, Inc.* v. *CommScope Technologies LLC* Inter Partes Review, IPR Nos. 2021-01390,2021-01391, 2021-01392, 2021-01393, 2021-01394, Aug. 11, 2021,440 Pages, Re: U.S. Pat. Nos. 7,639,982, 8,326,218, 8,577,286, and 9,332,402 from U.S. Appl. Nos. 10/740,944, 12/617,215, 13/662,948, and 14/054,223.
USPTO Patent Trial and Appeal Board, "Joint Motion to Dismiss the Petitions" in *SOLiD, Inc.*v. *CommScope Technologies LLC* Inter Partes Review, IPR Nos. 2021-01390, 2021-01391, 2021-01392, 2021-01393, 2021-01394, Nov. 10, 2021, pp. 1 through 6, Re: U.S. Pat. Nos. 7,639,982, 8,326,218, 8,577,286, and 9,332,402 from U.S. Appl. Nos. 10/740,944, 12/617,215, 13/662,948, and 14/054,223.
USPTO Patent Trial and Appeal Board, "Patent Owner's Mandatory Notices Pursuant to 37 C.F.R § 42.8" in *SOLiD, Inc.* v. *CommScope Technologies LLC* Interpartes Review, IPR No. 2021-01390, Sep. 2, 2021, pp. Cover through 4, Re: U.S. Pat. No. 7,639,982, from U.S. Appl. No. 10/740,944.
USPTO Patent Trial and Appeal Board, "Patent Owner's Mandatory Notices Pursuant to 37 C.F.R § 42.8" in *SOLiD, Inc.* v. *CommScope Technologies LLC* Inter Partes Review, IPR No. 2021-01391, Sep. 2, 2021, pp. Cover through 4, Re: U.S. Pat. No. 7,639,982, from U.S. Appl. No. 10/740,944.
USPTO Patent Trial and Appeal Board, "Patent Owner's Mandatory Notices Pursuant to 37 C.F.R § 42.8" in *SOLiD, Inc.* v. *CommScope Technologies LLC* Inter Partes Review, IPR No. 2021-01392, Sep. 2, 2021, pp. Cover through 3, Re: U.S. Pat. No. 8,326,218, from U.S. Appl. No. 12/617,215.
USPTO Patent Trial and Appeal Board, "Patent Owner's Mandatory Notices Pursuant to 37 C.F.R § 42.8" in *SOLiD, Inc.* v. *CommScope Technologies LLC* Inter Partes Review, IPR No. 2021-01393, Sep. 2, 2021, pp. Cover through 3, Re: U.S. Pat. No. 8,577,286, from U.S. Appl. No. 13/662,948.
USPTO Patent Trial and Appeal Board, "Patent Owner's Mandatory Notices Pursuant to 37 C.F.R § 42.8" in *SOLiD, Inc.* v. *CommScope Technologies LLC* Inter Partes Review, IPR No. 2021-01394, Sep. 2, 2021, pp. Cover through 3, Re: U.S. Pat. No. 9,332,402, from U.S. Appl. No. 14/054,223.
USPTO Patent Trial and Appeal Board, "Petition for Inter Partes Review under 37 C.F.R § 42.100" in *SOLiD, Inc.* v. *CommScope Technologies LLC* InterPartes Review, IPR No. 2021-01390, Dec. 29, 2009, pp. Cover through 116, Re: U.S. Pat. No. 7,639,982, from U.S. Appl. No. 10/740,944.
USPTO Patent Trial and Appeal Board, "Petition for Inter Partes Review under 37 C.F.R § 42.100" in *SOLiD, Inc.* v. *CommScope Technologies LLC* Interpartes Review, IPR No. 2021-01391, Dec. 29, 2009, pp. Cover through 115, Re: U.S. Pat. No. 7,639,982, from U.S. Appl. No. 10/740,944.
USPTO Patent Trial and Appeal Board, "Petition for Inter Partes Review under 37 C.F.R § 42.100" in *SOLiD, Inc.* v. *CommScope Technologies LLC* Interpartes Review, IPR No. 2021-01392, Dec. 4, 2012, pp. Cover through 105, Re: U.S. Pat. No. 8,326,218, from U.S. Appl. No. 12/617,215.
USPTO Patent Trial and Appeal Board, "Petition for Inter Partes Review under 37 C.F.R § 42.100" in *SOLiD, Inc.* v. *CommScope Technologies LLC* Interpartes Review, IPR No. 2021-01393, Nov. 5, 2013, pp. Cover through 72, Re: U.S. Pat. No. 8,577,286, from U.S. Appl. No. 13/662,948.
USPTO Patent Trial and Appeal Board, "Petition for Inter Partes Review under 37 C.F.R § 42.100" in *SOLiD, Inc.* v. *CommScope Technologies LLC* Inter Partes Review, IPR No. 2021-01394, May 3, 2016, pp. Cover through 87, Re: U.S. Pat. No. 9,332,402, from U.S. Appl. No. 14/054,223.
USPTO Patent Trial and Appeal Board, Certified Translation of Korean Patent Application Publication KR2001-0048227 in *SOLiD, Inc.*v. *CommScope Technologies LLC* Inter Partes Review, IPR Nos. 2021-01390, 2021-01391, 2021-01392, 2021-01393, 2021-01394, Aug. 12, 2021, 25 Pages, Re: U.S Pat. Nos. 7,639,982, 8,326,218, 8,577,286, and 9,332,402 from U.S. Appl. Nos. 10/740,944, 12/617,215, 13/662,948, and 14/054,223.
USPTO Patent Trial and Appeal Board, Wala, "A New Microcell Architecture Using Digital Optical Transport", cited in *SOLiD, Inc.* v. *CommScope Technologies LLC* Inter Partes Review, IPR Nos. 2021-01390, 2021-01391, 2021-01392, 2021-01393, 2021-01394, Aug. 12, 2021, 26 Pages, Re: U.S. Pat. Nos. 7,639,982, 8,326,218, 8,577,286, and 9,332,402 from U.S. Appl. Nos. 10/740,944, 12/617,215, 13/662,948, and 14/054,223.
High Court of Justice Business and Property Courts of England and Wales Intellectual Property List (ChD) Patent Court, Case No. HP-2020-000017, "Grounds of Invalidity", Aug. 26, 2020, pp. 31/23 through B1/27, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Amended Reply and Defence to Counterclaim", Aug. 6, 2021, pp. B1/28 through B1/31, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Statement of Case on Invalidity" Aug. 20, 2021,

(56) References Cited

OTHER PUBLICATIONS pp. B1/33 through B1/46, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Claimant's Notice of discontinuance" 39/22/2021, pp. B1/47, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Defendant's Notice of discontinuance", 39/24/2021, pp. B1/48, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Consent Order of Birss J" Oct. 29, 2020, pp. B1/49 through B1/53, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Confidentiality Order (by Consent) by Smith J", Jun. 6, 2021, pp. B1/54 through B1/60, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Consent Order of Meade J", Jul. 23, 2021, pp. B1/61 through B1/65, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Consent Order of HHJ Hacon", Sep. 21, 2021, pp. B1/66 through B1/67, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Order of HHJ Hacon", Sep. 28, 2021, pp. B1/68 through B1/70, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Technical Primer", Jul. 16, 2021, pp. B1/71 through B1/83, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Order of Mellor J", Nov. 23, 2021, pp. B1/84 through B1/90, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Claim Annex C", pp. B3/2 through B3/12, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 1", pp. B3/13 through B3/30, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 2", pp. B3/31 through B3/34, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 3", pp. B3/35 through B3/47, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Korean Patent Application Publication KR2001-0048227, pp. A3-36 through A3-43, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Certified Translation of Korean Patent Application Publication KR2001-0048227, pp. A3-44 through A3-53, Re: EP(UK) 2 290 850 and EP(UK) 1 570 326 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Korean Patent Application Publication KR10-2001-0018675, pp. A3-54 through A3-65, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Certified Translation of Korean Patent Application Publication KR10-2001-0018675, pp. A3-66 through A3-82, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Korean Patent Application Publication KR1999-0064537, pp. B2/2 through B2/12, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Certified Translation of Korean Patent Application Publication KR1999-0064537, pp. B2/13 through B2/24, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA10, United States District Court for the Northern District of Texas Dallas Division, "Rebuttal Expert Report of Dr. Anthony Acampora", pp. XX-AA/182 through XX-AA/572, Re: EP(UK) 2 290 850 and EP(UK) 1 570 626 issued from Foreign Counterparts to U.S. Appl. Nos. 09/619,431 and 10/395,743.
German Federal Patent Court, Docket No. 4 Ni 29/21 (EP), "Grounds of Objection to SOLiD Inc.'s Nullity Action from EP Patent No. 2 290 850 (DE 601 49 927)", Nov. 12, 2021, pp. 1-104, from Foreign Counterpart to U.S. Appl. No. 09/619,431.
German Federal Patent Court, Docket No. 4 Ni 29/21 (EP), "SOLiD Inc.'s Nullity Action from EP Patent No. 2 290 850 (DE 601 49 927)", Mar. 3, 2021, pp. 1-108, from Foreign Counterpart to U.S. Appl. No. 09/619,431.
German Federal Patent Court, Docket No. 4 Ni 29/21 (EP), "SOLiD Inc.'s Reply in the Nullity Action from EP Patent No. 2 290 850 (DE 601 49 927)", Feb. 11, 2022, pp. 1-41, from Foreign Counterpart to U.S. Appl. No. 09/619,431.
German Federal Patent Court, Docket No. 4 Ni 29/21 (EP), "Anlage NK 3 in the Nullity Action from EP Patent No. 2 290 850 (DE 601 49 927)", Mar. 3, 2021, pp. 1-2, from Foreign Counterpart to U.S. Appl. No. 09/619,431.

(56) References Cited

OTHER PUBLICATIONS

German Federal Patent Court, Docket No. 4 Ni 29/21 (EP), "Anlage NK 4 in the Nullity Action from EP Patent No. 2 290 850 (DE 601 49 927)", Mar. 3, 2021, pp. 1-2, from Foreign Counterpart to U.S. Appl. No. 09/619,431.
ADC Kentrox.COPYRGT. A Subsidiary of ADC Telecommunications, Inc. "And now a few words from your Customers . . . ", Aug. 1992 (4 pages).
ADC Kentrox, News Release, "ADC Kentrox Introduces Innovative Wireless Network Access Solution Cellular Subscribers Offered a New Level of Portable Services," Mar. 1, 1993 (3 pages).
ADC Kentrox, News Release, "First Field Trial Results Exceeds Expectations," Mar. 2, 1993 (2 pages).
ADC Kentrox Call Report, Oct. 18, 1992, call date Oct. 12, 1992, re: Bell Atlantic Mobile, Inc.
Akos et al., Jul. 1999, IEEE Transactions on Communications, 47:983-988, Direct Bandpass Sampling of Multiple Distinct RF Signals.
Ameritech, "Broadband Optical Transport Digital Microcell Connection Service--Interface and Performance Specifications. A technical descriptionof the User-Network Interface and Performance Specifications," AM TR-NIS 000117, (pp. 1-26), Issue 1, Dec. 1993.
Cellular Industry, The Day Group, "New Signal Transport Technology Digitizes the Cellular Band," 2 pages, (prior to Dec. 22, 2000).
Cox "A Radio System Proposal for Widespread Low-Power Tetherless Communications," IEEE Transactions on Communications, vol. 39(2), Feb. 1991, pp. 324-335.
Electronic Letters, an International Publication, Nov. 19, 1987, vol. 23 No. 24, pp. 1255-1257.
1998 Foxcom Wireless Proprietary Information, pp. 1-8, "Litenna In-Building RF Distribution System."
Gupta et al., "Land Mobile Radio Systems—A Tutorial Exposition", IEEE Communications Magazine, vol. 23(6), Jun. 1985, p. 37.
Ishio et al., "A Two-Way Wavelength-Division-Multiplexing Transmission and its Application to a Switched TV Distribution System," Electrical Communication Laboratories, Nipon Telegrah & Telephone Public Corporation, Yokosuka, Japan and Technical Bureau, Nippon Telegraph & Telephone Public Corporation, Tokyo, Japan, (10 pages) (prior to Dec. 22, 2000).
Kobb, "Personal Wireless," Special Report/Communications, IEEE Spectrum, Jun. 1993, pp. 20-25.
Lee et al., 1993 43rd IEEE Vehicular Technology Conference, May 18-20, 1993, Personal Communication—Freedom Through Wireless Technology, PacTel Corporation, published May 18, 1993, "Intelligent Microcell Applications in PCS," pp. 722-725.
Merrett et al., 41st IEEE Vehicular Technology Conference, May 19-22, 1991, Gateway to the Future Technology, 91CH2944-7, British Telecom Research Laboratories, "A Cordless Access System Using Radio-Over-Fibre Techniques," pp. 921-924.
Miicrowaves & RF, "Digital Transport for Cellular," Feb. 1993.
O'Byrne, Vehicular Technology Society 42nd VTS Conference Frontiers of Technology, From Pioneers to the 21st Century, GTE Laboratories Incorporated, "TDMA and CDMA in a Fiber-Optic Environment," vol. 2 of 2, pp. 727-731 (May 10, 1992).
Payne et al., "Single Mode Optical Local Networks", Globecom '85, IEEE Global Telecommunications Conference, Dec. 2-5, 1985, pp. 1201-1205.
Quinn, "The Cell Enhancer", Bell Atlanttic Mobile Systems, pp. 77-83.
Russell, New Microcell Technology Sets Cellular Carriers Free, Telephony, Mar. 1993, pp. 40, 42 and 46.
R. Steele. Towards a High-Capacity Digital Cellular Mobile Radio System. "Towards a High Capacity Digital Cellular Mobile Radio System," IEE Proceedings, vol. 132, Pt.F, No. 5, Aug. 1985, pp. 405-415.
Tang, Fiber Optic Antenna Remoting for Multi-Sector Cellular Cell Sites. GTE Laboratories—Abstract (Conference Jun. 14-18, 1992).
Titch, "Kentrox boosts coverage and capacity," Telephony Jan. 25, 1993 (1 page).
Urban Microcell System Layout. GTE Laboratories (Conference Jun. 14-18, 1992).
Wala, 1993 43rd IEEE Vehicular Technology Conference, May 18-20, 1993, Personal Communication—Freedom Through Wireless Technology, Waseca Technology Inc., published May 18, 1993, "A New Microcell Freedom Architecture Using Digital Optical Transport," pp. 585-588.
"ZoneMaster.TM.—Maximum Coverage for High-Capacity Locations". Decibel Multi Media MicroCELL System. 4 pages 1993 Decibel Products. 2-83-5M.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", , pp. 1171-1175, Publisher: IEEE.
Harvey et al., "Cordless Communications Utilising Radio Over Fibre Techniques for the Local Loop", "IEEE International Conference on Communications", Jun. 1991, pp. 1171-1175, Publisher: IEEE.
China Patent Office, "Notice of Grant of Patent Right for Invention from CN Application No. 01815499.9 mailed Oct. 24, 2008", "from Foreign Counterpart of U.S. Appl. No. 09/619,431", Oct. 24, 2008, pp. 1-4, Published in: CN.
Chinese Patent Office, "First Office Action from CN Application No. 01815499.9 mailed Jul. 8, 2005", "from Foreign Counterpart of U.S. Appl. No. 09/619,431", Jul. 8, 2005, pp. 1-8, Published in: CN.
Chinese Patent Office, "Second Office Action from CN Application No. 01815499.9 mailed May 11, 2007", "from Foreign Counterpart of U.S. Appl. No. 09/619,431", May 11, 2007, pp. 1-5, Published in: CN.
Chinese Patent Office, "Third Office Action from CN Application No. 01815499.9 mailed Oct. 26, 2007", "from Foreign Counterpart of U.S. Appl. No. 09/619,431", Oct. 26, 2007, pp. 1-8, Published in: CN.
Chinese Patent Office, "Fourth Office Action from CN Application No. 01815499.9 mailed Mar. 7, 2007", "from Foreign Counterpart of U.S. Appl. No. 09/619,431", Mar. 7, 2007, pp. 1-8, Published in: CN.
Chinese Patent Office, "Notification to Grant Patent Right for Invention from CN Application No. 200710153587. X mailed May 28, 2013", "from Foreign Counterpart of U.S. Appl. No. 09/619,431", May 28, 2013, pp. 1-3, Published in: CN.
Chinese Patent Office, "Second Office Action from CN Application No. 200710153587.X mailed Feb. 4, 2013", "from Foreign Counterpart of U.S. Appl. No. 09/619,431", Feb. 4, 2013, pp. 1-7, Published in: CN.
Chinese Patent Office, "First Office Action from CN Application No. 200710153587.X mailed Mar. 19, 2010", "from Foreign Counterpart of U.S. Appl. No. 09/619,431", Mar. 19, 2010, pp. 1-12, Published in: CN.
Chinese Patent Office, "Decision on Rejection from CN Application No. 200710153587.X mailed Nov. 2, 2010", "from Foreign Counterpart of U.S. Appl. No. 09/619,431", Nov. 2, 2010, pp. 1-9, Published in: CN.
Chinese Patent Office, "Notice of Reexamination from CN Application No. 200710153587.X mailed Jun. 21, 2012", "from Foreign Counterpart of U.S. Appl. No. 09/619,431", Jun. 21, 2012, pp. 1-18, Published in: CN.
Chinese Patent Office, "Second Office Action from CN Application No. 200910005002.9 mailed Jan. 23, 2013", "from Foreign Counterpart of U.S. Appl. No. 09/619,431", Jan. 23, 2013, pp. 1-11, Published in: CN.
China Patent Office, "Notification to Grant Patent Right for Invention from CN Application No. 200910005002.9 mailed Aug. 19, 2013", Aug. 19, 2013, pp. 1-6, Published in: CN.
Chinese Patent Office, "First Office Action from CN Application No. 200910005002.9 mailed Apr. 6, 2012", "from Foreign Counterpart of U.S. Appl. No. 09/619,431", Apr. 6, 2012, pp. 1-12, Published in: CN.
European Patent Office, "Communication under Rule 71(3) EPC from EPO Application No. 01950794.6-2411 mailed May 3, 2011",

(56) References Cited

OTHER PUBLICATIONS

"from Foreign Counterpart of U.S. Appl. No. 09/619,431", May 3, 2011, pp. 1-45, Published in: EP.
European Patent Office, "Office Action from EPO Application No. 01950794.6-2411 mailed Feb. 24, 2006", "from Foreign Counterpart of U.S. Appl. No. 09/619,431", Feb. 24, 2006, pp. 1-5, Published in: EP.
European Patent Office, "Office Action from EPO Application No. 01950794.6-2411 mailed Mar. 6, 2007", "from Foreign Counterpart of U.S. Appl. No. 09/619,431", Mar. 6, 2007, pp. 1-4, Published in: EP.
European Patent Office, "Office Action from EPO Application No. 01950794.6-2411 mailed Nov. 16, 2010", "from Foreign Counterpart of U.S. Appl. No. 09/619,431", Nov. 16, 2010, pp. 1-4, Published in: EP.
European Patent Office, "Summons to Attend Oral Proceedings from EPO Application No. 01950794.6-2411 mailed May 21, 2010", "from Foreign Counterpart of U.S. Appl. No. 09/619,431", May 21, 2010, pp. 1-6, Published in: EP.
European Patent Office, "Extended European Search Report from EPO Application No. 10011450.3-2411 mailed Jan. 14, 2011", "from Foreign Counterpart of U.S. Appl. No. 09/619,431", Jan. 14, 2011, pp. 1-9, Published in: EP.
U.S. Patent Office, "Notice of Allowance", "U.S. Appl. No. 09/619,431", Aug. 12, 2003, pp. 1-9.
U.S. Patent and Trademark Office, "Office Action", "U.S. Appl. No. 09/619,431", Mar. 13, 2003, pp. 1-15.
U.S. Patent and Trademark Office, "Final Office Action", "U.S. Appl. No. 10/740,944", Apr. 25, 2007, pp. 1-19.
U.S. Patent and Trademark Office, "Final Office Action", "U.S. Appl. No. 10/740,944", Jul. 18, 2007, pp. 1-21.
U.S. Patent and Trademark Office, "Final Office Action", "U.S. Appl. No. 10/740,944", Oct. 3, 2007, pp. 1-22.
U.S. Patent and Trademark Office, "Final Office Action", "U.S. Appl. No. 10/740,944", Oct. 14, 2008, pp. 1-25.
U.S. Patent and Trademark Office, "Notice of Allowance", "U.S. Appl. No. 10/740,944", Aug. 13, 2009, pp. 1-12.
U.S. Patent and Trademark Office, "Office Action", "U.S. Appl. No. 10/740,944", Aug. 24, 2006, pp. 1-19.
U.S. Patent and Trademark Office, "Final Office Action", "U.S. Appl. No. 10/740,944", Feb. 5, 2007, pp. 1-16.
U.S. Patent and Trademark Office, "Office Action", "U.S. Appl. No. 10/740,944", Apr. 3, 2008.
U.S. Patent and Trademark Office, "Office Action", "U.S. Appl. No. 10/740,944", Feb. 27, 2009, pp. 1-25.
U.S. Patent and Trademark Office, "Notice of Allowance", "U.S. Appl. No. 12/617,215", Aug. 2, 2012, pp. 1-11.
U.S. Patent and Trademark Office, "Office Action", "U.S. Appl. No. 12/617,215", Apr. 11, 2012, pp. 1-12.
U.S. Patent and Trademark Office, "Notice of Allowance and Fees Due", "from U.S. Appl. No. 13/662,948", Jul. 3, 2013, pp. 1-10, Published in: US.
U.S. Patent and Trademark Office, "Office Action", "from U.S. Appl. No. 13/662,948", Apr. 24, 2013, pp. 1-23, Published in: US.
The International Bureau of WIPO, "International Preliminary Examination Report from PCT Application No. PCT/US 01/21021 mailed Jun. 10, 2002", "from PCT Counterpart of U.S. Appl. No. 09/619,431", Jun. 10, 2002, pp. 1-3, Published in: WO.
International Searching Authority, "International Search Report from PCT Application No. PCT/US 01/21021 mailed Nov. 15, 2001", "from Foreign Counterpart of U.S. Appl. No. 09/619,431", Nov. 15, 2001, pp. 1-7, Published in: WO.
The International Bureau of WIPO, "Written Opinion from PCT Application No. PCT/US 01/21021 mailed Mar. 18, 2002", "from Foreign Counterpart of U.S. Appl. No. 09/619,431", Mar. 18, 2002, pp. 1-2, Published in: WO.
China Patent Office, "Notice of Grant of Patent Right for Invention from CN Application No. 94192782.2 mailed Sep. 29, 2000", "from Foreign Counterpart of U.S. Appl. No. 08/204,660", Sep. 29, 2000, pp. 1-4, Published in: CN.
Japan Patent Office, "Office Action from JP Application No. 6-525837 mailed Oct. 14, 2003", "from foreign counterpart of U.S. Appl. No. 08/204,660", Oct. 14, 2003, pp. 1-2, Published in: JP.
U.S. Patent and Trademark Office, "Final Office Action", "U.S. Appl. No. 08/204,660", Jun. 12, 1996, pp. 1-8, Published in: US.
U.S. Patent and Trademark Office, "Notice of Allowance", "U.S. Appl. No. 08/204,660", Oct. 2, 1996, pp. 1-4, Published in: US.
U.S. Patent and Trademark Office, "Office Action", "U.S. Appl. No. 08/204,660", Apr. 4, 1995, pp. 1-14, Published in: US.
U.S. Patent and Trademark Office, "Office Action", "U.S. Appl. No. 08/204,660", Oct. 26, 1995, pp. 1-8, Published in: US.
U.S. Patent and Trademark Office, "Office Action", "U.S. Appl. No. 08/299,159", Feb. 1-9, 1997, pp. 1-9, Published in: US.
U.S. Patent and Trademark Office, "Restriction Requirement", "U.S. Appl. No. 08/204,660", Mar. 10, 1995, pp. 1-13, Published in: US.
U.S. Patent and Trademark Office, "Notice of Intent to Issue a Reexam Certificate", "U.S. Appl. No. 90/010,357", Jun. 22, 2010, pp. 1-18, Published in: US.
U.S. Patent and Trademark Office, "Order Granting/Denying Request for Ex Parte Reexamination", "U.S. Appl. No. 90/010,357", Mar. 12, 2009, pp. 1-10, Published in: US.
U.S. Patent and Trademark Office, "Office Action", "U.S. Appl. No. 90/010,357", Sep. 25, 2009, pp. 1-17, Published in: US.
U.S. Patent and Trademark Office, "Office Action", "U.S. Appl. No. 08/294,742", May 27, 1996, pp. 1-5, Published in: US.
U.S. Patent and Trademark Office, "Office Action", "U.S. Appl. No. 08/294,742", Oct. 26, 1996, pp. 1-4, Published in: US.
U.S. Patent and Trademark Office, "Office Action", "U.S. Appl. No. 08/298,652", May 29, 1995, pp. 1-7, Published in: US.
U.S. Patent and Trademark Office, "Notice of Allowance", "U.S. Appl. No. 08/299,159", Aug. 19, 1997, pp. 1-9, Published in: US.
U.S. Patent and Trademark Office, "Office Action", "U.S. Appl. No. 08/299,159", Jul. 17, 1995, pp. 1-5, Published in: US.
U.S. Patent and Trademark Office, "Office Action", "U.S. Appl. No. 08/299,159", Apr. 9, 1996, pp. 1-3, Published in: US.
U.S. Patent and Trademark Office, "Office Action", "U.S. Appl. No. 08/299,159", Oct. 2, 1996, pp. 1-2, Published in: US.
U.S. Patent and Trademark Office, "Notice of Allowance", "U.S. Appl. No. 08/410,129", Oct. 17, 1996, pp. 1-6, Published in: US.
U.S. Patent and Trademark Office, "Office Action", "U.S. Appl. No. 08/410,129", Jan. 23, 1996, pp. 1-12, Published in: US.
U.S. Patent and Trademark Office, "Notice of Intent to Issue a Reexam Certificate", "U.S. Appl. No. 90/010,362", Jun. 22, 2010, pp. 1-16, Published in: US.
U.S. Patent and Trademark Office, "Order Granting/Denying Request for Ex Parte Reexamination", "U.S. Appl. No. 90/010,362", Apr. 17, 2009, pp. 1-8, Published in: US.
U.S. Patent and Trademark Office, "Office Action", "U.S. Appl. No. 90/010,362", Sep. 25, 2009, pp. 1-18, Published in: US.
U.S. Patent and Trademark Office, "Notice of Allowance", "U.S. Appl. No. 09/747,273", Aug. 8, 2007, pp. 1-8.
U.S. Patent and Trademark Office, "Office Action", "U.S. Appl. No. 09/747,273", Mar. 30, 2004, pp. 1-19.
U.S. Patent and Trademark Office, "Office Action", "U.S. Appl. No. 09/747,273", Oct. 6, 2005, pp. 1-10.
U.S. Patent and Trademark Office, "Final Office Action", "U.S. Appl. No. 90/010,363", Jun. 23, 2010, pp. 1-21, Published in: US.
U.S. Patent and Trademark Office, "Notice of Intent to Issue a Reexam Certificate", "U.S. Appl. No. 90/010,363", Dec. 6, 2010, pp. 1-21, Published in: US.
U.S. Patent and Trademark Office, "Order Granting/Denying Request for Ex Parte Reexamination", "U.S. Appl. No. 09/010,363", Apr. 17, 2009, pp. 1-10, Published in: US.
U.S. Patent and Trademark Office, "Office Action", "U.S. Appl. No. 90/010,363", Sep. 25, 2009, pp. 1-32, Published in: US.
U.S. Patent and Trademark Office, "Advisory Action", "U.S. Appl. No. 11/937,255", Nov. 3, 2011, pp. 1-2.
U.S. Patent and Trademark Office, "Final Office Action", "U.S. Appl. No. 11/937,255", Aug. 29, 2011, pp. 1-14.
U.S. Patent and Trademark Office, "Notice of Allowance", "U.S. Appl. No. 11/937,255", Sep. 17, 2012, pp. 1-11.

(56) References Cited

OTHER PUBLICATIONS

U.S. Patent and Trademark Office, "Office Action", "U.S. Appl. No. 11/937,255", Feb. 17, 2011, pp. 1-13.
U.S. Patent and Trademark Office, "Office Action", "U.S. Appl. No. 13/725,866", Jan. 22, 2014, pp. 1-28, Published in: US.
U.S. Patent and Trademark Office, "Restriction Requirement", "U.S. Appl. No. 13/725,866", Sep. 10, 2013, pp. 1-8, Published in: US.
The International Bureau of WIPO, "International Preliminary Report on Patentability from PCT Application No. PCT/US 94/05897 mailed May 29, 1995", May 29, 1995, pp. 1-8, Publisher: from PCT Counterpart of U.S. Appl. No. 08/204,660, Published in: WO.
The International Bureau of WIPO, "International Search Report from PCT Application No. PCT/US 94/05897 mailed Oct. 31, 1994", "from PCT Counterpart of U.S. Appl. No. 08/204,660", Oct. 31, 1994, pp. 1-7, Published in: WO.
The International Bureau of WIPO, "Written Opinion from PCT Application No. PCT/US 94/05897 mailed Feb. 14, 1995", "from PCT Counterpart to U.S. Appl. No. 08/204,660", Feb. 14, 1995, pp. 1-7, Published in: WO.
China Patent Office, "Notification of Grant Patent Right for Invention from CN Application No. 200380109396.3 mailed Jun. 29, 2010", "from Chinese Counterpart of U.S. Appl. No. 10/395,743", Jun. 29, 2010, pp. 1-4, Published in: CN.
China Patent Office, "First Office Action from CN Application No. 200380109396.3 mailed Jan. 4, 2008", "from Chinese Counterpart of U.S. Appl. No. 10/395,743", Jan. 4, 2008, pp. 1-7, Published in: CN.
European Patent Office, "Office Action from EPO Application No. 03790242.6-2415 mailed Jul. 24, 2007", "from European Counterpart of U.S. Appl. No. 10/395,743", Jul. 24, 2007, pp. 1-4, Published in: EP.
European Patent Office, "Office Action from EPO Application No. 03790242.6-2415 mailed Feb. 11, 2009", "from European Counterpart of U.S. Appl. No. 10/395,743", Feb. 11, 2009, pp. 1-4, Published in: EP.
Korean Patent Office, "Decision to Grant from KR Application No. 2005-7010190 mailed Feb. 2, 2012", "from Foreign Counterpart to U.S. Appl. No. 10/395,743", Feb. 2, 2012, pp. 1-7, Published in: KR.
Korean Patent Office, "Office Action from KR Application No. 2005-7010190 mailed Sep. 30, 2010", "from Foreign Counterpart to U.S. Appl. No. 10/395,743", Sep. 30, 2010, pp. 1-5, Published in: KR.
Korean Patent Office, "Final Rejection from KR Application No. 2005-7010190 mailed Oct. 31, 2011", "from Korean Counterpart to U.S. Appl. No. 10/395,743", Oct. 31, 2011, pp. 1-3, Published in: KR.
The International Bureau of WIPO, "International Preliminary Report on Patentability from PCT Application No. PCT/US03/38302 mailed Dec. 14, 2011", "from PCT Counterpart of U.S. Appl. No. 10/395,743", Dec. 14, 2011, pp. 1-10, Published in: WO.
The International Bureau of WIPO, "International Search Report from PCT Application No. PCT/US03/38302 mailed May 2, 2005", "from PCT Counterpart of U.S. Appl. No. 10/395,743", May 2, 2005, pp. 1-5, Published in: WO.
Foxcom Wireless Proprietary Information, "Application Note RFIBER-RF Fiberoptic Links for Wireless Applications", 1998, pp. 3-11.
City Cell, Cellular Industry the Day Group, "ADC Kentrox Citycell Field Trial Yields Another First—Simultaneous Analog and Digital Calls", prior to Dec. 22, 2000, p. 1.
Ericksson, "Advertisement by Ericksson", "Telephony", 1994, p. 1.
"ADC Kentrox Introduces Citycell 824, A Replacement for Conventional Cell Sites; Company's Original Goal Was to Improve F", "Telocator Bulletin", Feb. 1993, p. 1.
Foxcom Wireless Properietary Information, "Litenna In-Building RF Distribution System", 1998, pp. 1-8.
Horowitz, Paul, "Digital Electronics", "The Art of Electronics", 1980, p. 316, Publisher: Press Syndicte of the University of Cambridge.
Schneiderman, "Offshore Markets Gain in Size, Competitiveness Even the Smallest Industry Companies Are Expanding Their Global Buisness", "Microwaves and RF", Mar. 1993, pp. 33-39, vol. 32, No. 3, Publisher: Penton Publishing, Inc, Published in: Berea, OH.
Nakatsugawa et al., "Software Radio Base and Personal Stations for Cellular/PCS Systems", 2000, pp. 617-621, Publisher: IEEE.
European Patent Office, "Communication Under Rule 71(3) EPC from EPO Application No. 03790242.6-2415 mailed May 14, 2013", "from European Counterpart of U.S. Appl. No. 10/395,743", May 15, 2013, pp. 1-27, Published in: EP.

* cited by examiner

DISTRIBUTED DIGITAL ANTENNA SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

*This Reissue Application is a reissue of application Ser. No. 10/395,743, filed Mar. 24, 2003, which issued as U.S. Pat. No. 8,958,789.* This application claims priority to U.S. Provisional Patent Application Ser. No. 60/430,434 filed Dec. 3, 2002, and titled "Distributed Digital Antenna System," which is commonly assigned and incorporated by reference herein.

TECHNICAL FIELD

The present invention relates generally to communications and particularly to communications through a distributed antenna system.

BACKGROUND

Various types of wireless communication systems have become prevalent around the world. For example, cellular communication systems cover most major metropolitan areas as well as major highways through remote areas. Cellular systems permit individuals with cellular handsets to communicate with base stations that are connected to the public switched telephone network (PSTN) or some other communication network.

As with any communication system, cellular systems can leave coverage "holes" where the signal from the base stations cannot reach. The holes can be in tunnels, valleys, city streets between tall buildings, or any other location where a radio frequency (RF) signal is blocked.

Placing additional base stations where these coverage holes are located is not always an option. Base stations tend to be very expensive due not only to the cost of the equipment but also because of land acquisition costs. Additionally, large base station antennas may not fit within an area either physically or aesthetically.

One solution to hole coverage is to use smaller remote antennas where coverage is needed but a base station is not warranted or desired. One problem with remote antennas, however, is that coaxial cable cannot be run long distances due to attenuation. Remote antennas are difficult to install along a highway or through a tunnel due to this attenuation problem. Using repeaters may not be an option since this only adds to the expense and complexity of the system. There is a resulting need in the art for a distributed antenna system that does not suffer from attenuation problems.

SUMMARY OF THE INVENTION

The embodiments of the present invention encompass a distributed digital antenna system that has a host unit for converting radio frequency signals to digital optical signals and digital optical signals to radio frequency signals. The digital optical signals are transmitted over an optical medium to a plurality of remote units that are daisy-chained along the optical medium. Each remote unit transmits an analog representation of the digital optical signals from the host unit and receives radio frequency signals that are converted by the remote unit to digital optical signals for use by the host unit.

DETAILED DESCRIPTION OF THE PREFERRED EMBODIMENT

The embodiments of the present invention provide a digital distributed antenna system that enables a communication system to fill coverage holes without the expense of additional base stations. This is accomplished by distributing a fiber optic cable through the area in which coverage is desired and tapping into the fiber at desired antenna locations.

The embodiments of the present invention refer to fiber optics as a means of communication between remote units and the host unit. However, any optical medium, such as a laser through the air, can be substituted for the optical fiber.

Figure 1:
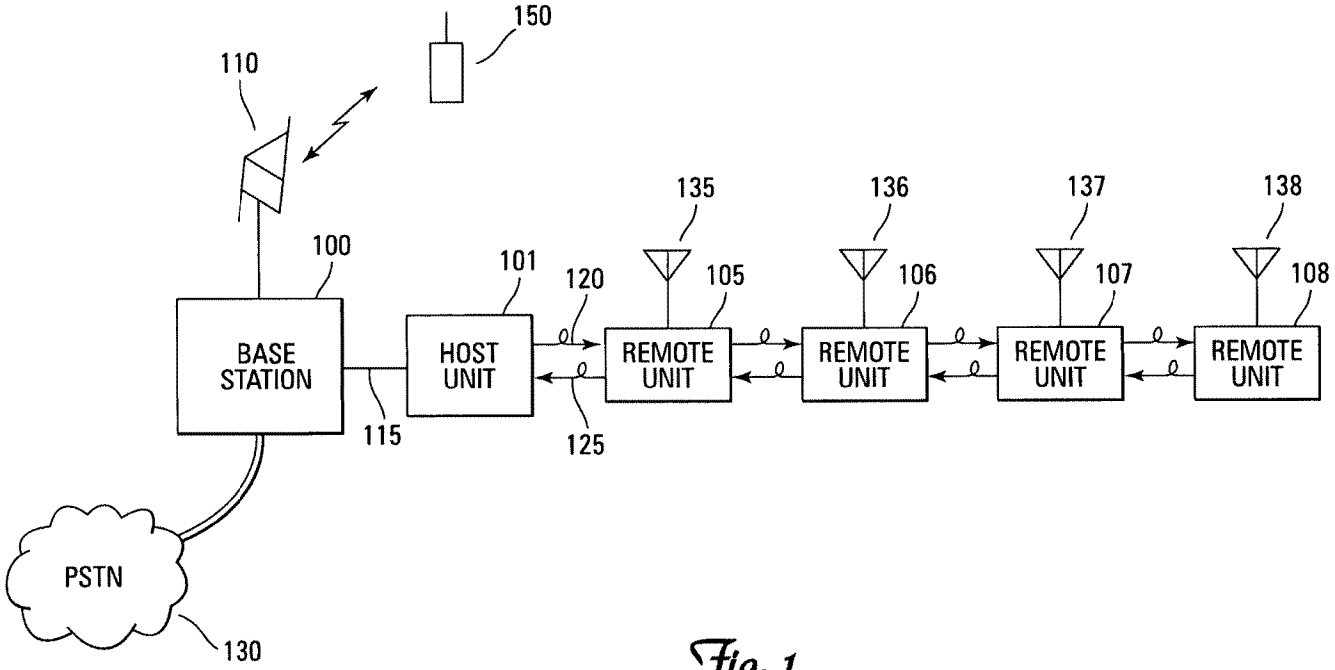
FIG. 1 shows a block diagram of one embodiment of a distributed digital antenna system of the present invention.

FIG. 1 illustrates a block diagram of one embodiment of a distributed digital antenna system of the present invention. The system has a base station (100) that communicates over an RF link using an antenna (110). The base station communicates over the RF link using any appropriate air interface standard. For example, the air interface standard comprises one of Advanced Mobile Phone System (AMPS), code division multiple access (CDMA), time division multiple access (TDMA), or Global System for Mobile communications (GSM) or any other appropriate air interface standard.

The RF link is made up of a forward link over which the base station (100) transmits to a subscriber unit wireless terminal (150). The subscriber unit (150) transmits back to the base station (100) over a reverse link. The subscriber unit (150) is either a mobile station or a fixed station such as in a wireless local loop system.

The base station (100) has the transmitters and receivers that enable the subscriber unit (150) to communicate with the public switched telephone network (PSTN) (130). In one embodiment, the base station also links the subscriber unit (150) to other subscriber units that are communicating with other base stations. In one embodiment, the base station (100) is connected to the PSTN through a mobile switching center that handles the switching of calls with multiple base stations.

A host unit (101) is connected to the base station (100) through an RF link (115). In one embodiment, this link (115) is a coaxial cable. Other embodiments use other types of connections such as an air interface or an optical fiber carrying digital RF signals. U.S. patent application Ser. No. 09/619,431, assigned to ADC Telecommunications, Inc. and incorporated herein by reference, discusses digital RF signals.

The host unit (101) is responsible for converting the RF signal from the base station (100) to an optical signal for transmission over an optical medium. The host unit (101)

also converts a received optical signal to an RF signal for transmission to the base station (100). In other embodiments, the host unit (101) performs additional functions.

One or more remote units (105-108) are connected to the host unit (101) through an optical medium, such as fiber optic lines (120 and 125), in a daisy-chain arrangement. The remote units (105-108) are placed in locations that require additional signal coverage due to a lack of coverage by the base station (100). The remote units (105-108) communicate with subscriber units in a particular remote unit's coverage area over an RF link provided by the remote unit antennas (135-138).

For purposes of illustration, four remote units (105-108) are shown. However, alternate embodiments use other quantities of remote units. If only a small geographic area requires coverage, as few as one remote unit (105) is used. If a highway in a remote area requires additional coverage, more than four remote units are typically used.

The embodiment of FIG. 1 uses a separate fiber optic line for each direction of communication. Each fiber carries a different wavelength. For example, the fiber optic line (120) from the host unit (101) to the remote units (105-108) carries a wavelength of $\lambda_1$. The fiber optic line (125) from the remote units (105-108) to the host unit (101) carries a wavelength of $\lambda_2$. In alternate embodiments, each fiber carries the same wavelength.

The fiber optic line (120) from the host unit (101) to the remote units (105-108) carries the digital optical signal for transmission by the (105-108). The fiber optic line (125) from the remote units (105-108) carries a digital optical signal comprising the sum of the received signals from each of the remote units (105-108). The generation of this summation signal from the remote units is discussed subsequently.

Figure 2:
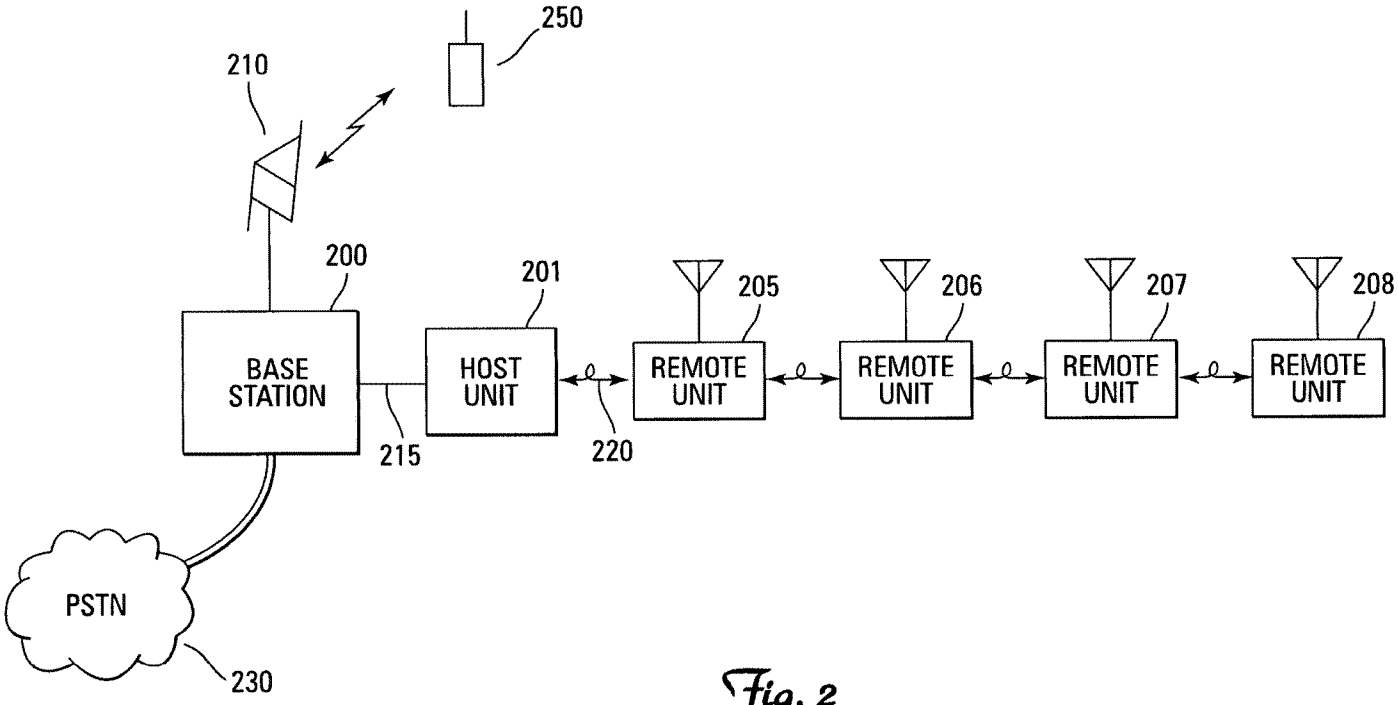
FIG. 2 shows a block diagram of another embodiment of a distributed digital antenna system of the present invention.

FIG. 2 illustrates a block diagram of another embodiment of a distributed digital antenna system of the present invention. This system is similar to the embodiment of FIG. 1 except that the remote units (205-208) are connected to the host unit (201) over a single optical medium (220).

The system of FIG. 2 has a base station (200) that communicates over an RF link using an antenna (210). The base station can communicate over the RF link using any air interface standard. For example, the air interface standard may be code division multiple access (CDMA), time division multiple access (TDMA), or Global System for Mobile communications (GSM).

The RF link is made up of a forward link over which the base station (200) transmits to a subscriber unit (250). The subscriber unit (250) transmits back to the base station (200) over a reverse link. The subscriber unit (250) may be a mobile station or a fixed station such as in a wireless local loop system.

The base station (200) has the transmitters and receivers that enable the subscriber unit (250) to communicate with the public switched telephone network (PSTN) (230). The base station may also link the subscriber unit (250) to other subscriber units that are communicating with other base stations. In one embodiment, the base station (200) is connected to the PSTN through a mobile switching center that handles the switching of calls with multiple base stations.

A host unit (201) is connected to the base station (200) through an RF link (215). In one embodiment, this link (215) is a coaxial cable. Other embodiments use other types of connections such as an air interface or an optical fiber carrying digital RF signals.

The host unit (201) is responsible for converting the RF signal from the base station (200) to a digital optical signal for transmission over an optical medium. The host unit (201) also converts a received optical signal to an RF signal for transmission to the base station (200). In other embodiments, the host unit (201) performs additional functions.

One or more remote units (205-208) are connected to the host unit (201) through an optical medium, such as a fiber optic line (220), that is connected in a daisy-chain arrangement. The remote units (205-208) are placed in locations that require additional signal coverage due to a lack of coverage by the base station (200).

For purposes of illustration, four remote units (205-208) are shown. However, alternate embodiments use other quantities of remote units.

The embodiment of FIG. 2 uses a single fiber optic line (220) for communication both to and from the remote units (205-208). This is accomplished by the single fiber (220) carrying multiple wavelengths. For example, the fiber optic line (220) uses a wavelength of $\lambda_1$ for the digital signal from the host unit to the remote units (205-208). The fiber optic line (220) also carries a digital summation signal with a wavelength of $\lambda_2$. This digital summation signal is the sum of the received signals from the remote units (205-208). The generation of this summation signal from the remote units is discussed subsequently.

Figure 3:
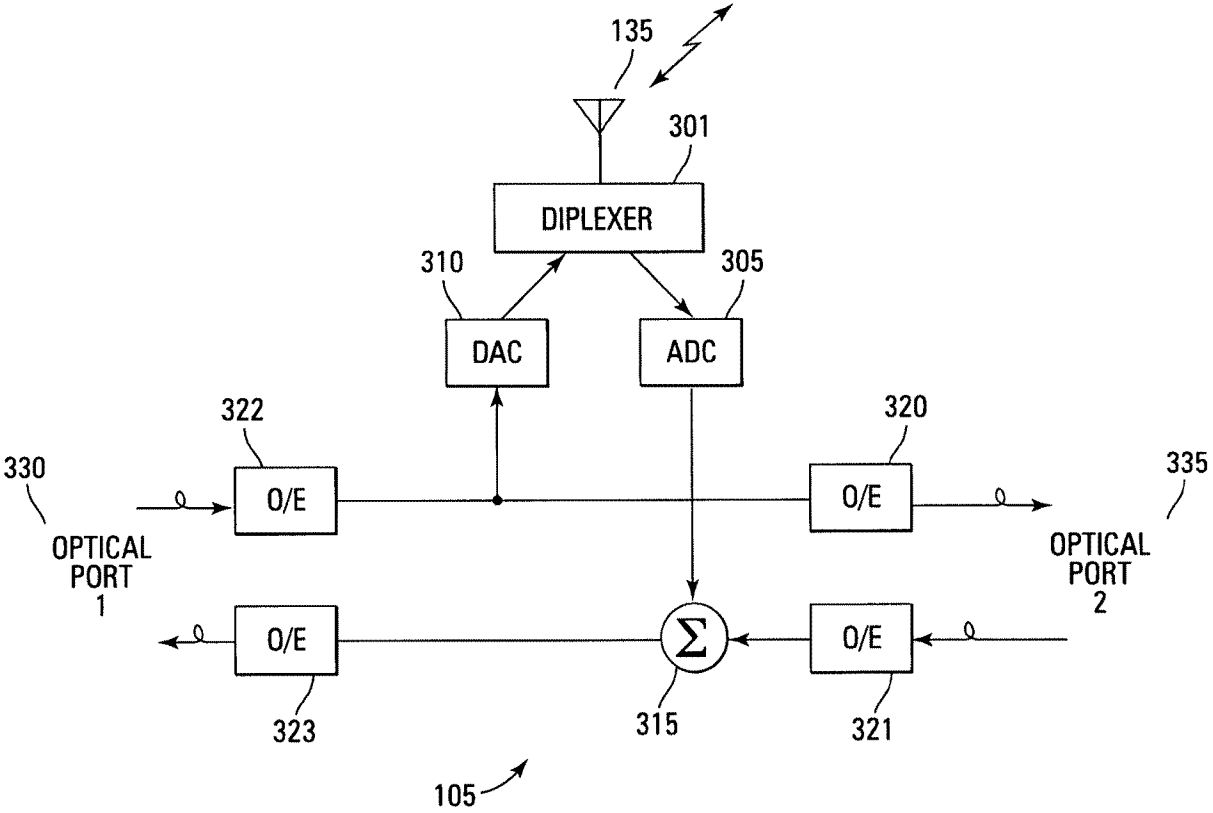
FIG. 3 shows a block diagram of one embodiment of a remote unit in accordance with the system of FIG. 1.

FIG. 3 illustrates a block diagram of one embodiment of a remote unit (105) of FIG. 1. Each of the remote units (105-108) of the embodiment of FIG. 1 are substantially identical in functional composition.

The remote unit (105) transmits and receives RF signals over the antenna (135). Both the receive and transmit circuitry is connected to the antenna (135) through a diplexer (301).

Alternate embodiments use other quantities of antennas. For example, one embodiment uses three antennas to cover three different sectors of an area.

An analog signal that is received on the antenna (135) is split off by the diplexer (301) to an analog-to-digital converter (305). The analog-to-digital converter (305) digitizes the received analog signal by periodically sampling the signal. The sampling generates a digital representation of the received analog signal.

The digitized received signal is input to a summer (315) to be added to the digitized signals from the preceding remote units in the daisy-chain. The input of the summer (315), therefore, is coupled to an output of a previous remote unit. The output of the summer (315) is a summation signal that is coupled to either the input of a subsequent remote unit or to the host unit. The host unit thus receives a summation signal that represents the sum of all the signals received by the remote units (105-108) of the system.

A digital signal from the host unit is coupled to a digital-to-analog converter (310). The digital-to-analog converter (310) takes the digital representation of an analog signal and converts it to the analog signal for transmission by the antenna (135).

Optical-to-Electrical converters (320-323) are located at the optical ports (330 and 335) of the remote unit (105). Each optical port (330 and 335) has an input and an output that are each coupled to an Optical-to-Electrical converter (320-323).

Since the remote unit (105) operates with electrical signals that are represented by the optical signals coming in through the optical ports (330 and 335), the Optical-to-Electrical converters (320-323) are responsible for converting the optical signals to electrical signals for processing by the remote unit (105). The Optical-to-Electrical converters (320-323) are also responsible for converting received electrical signals from electrical to an optical representation for transmission over the optical fiber.

Figure 4:
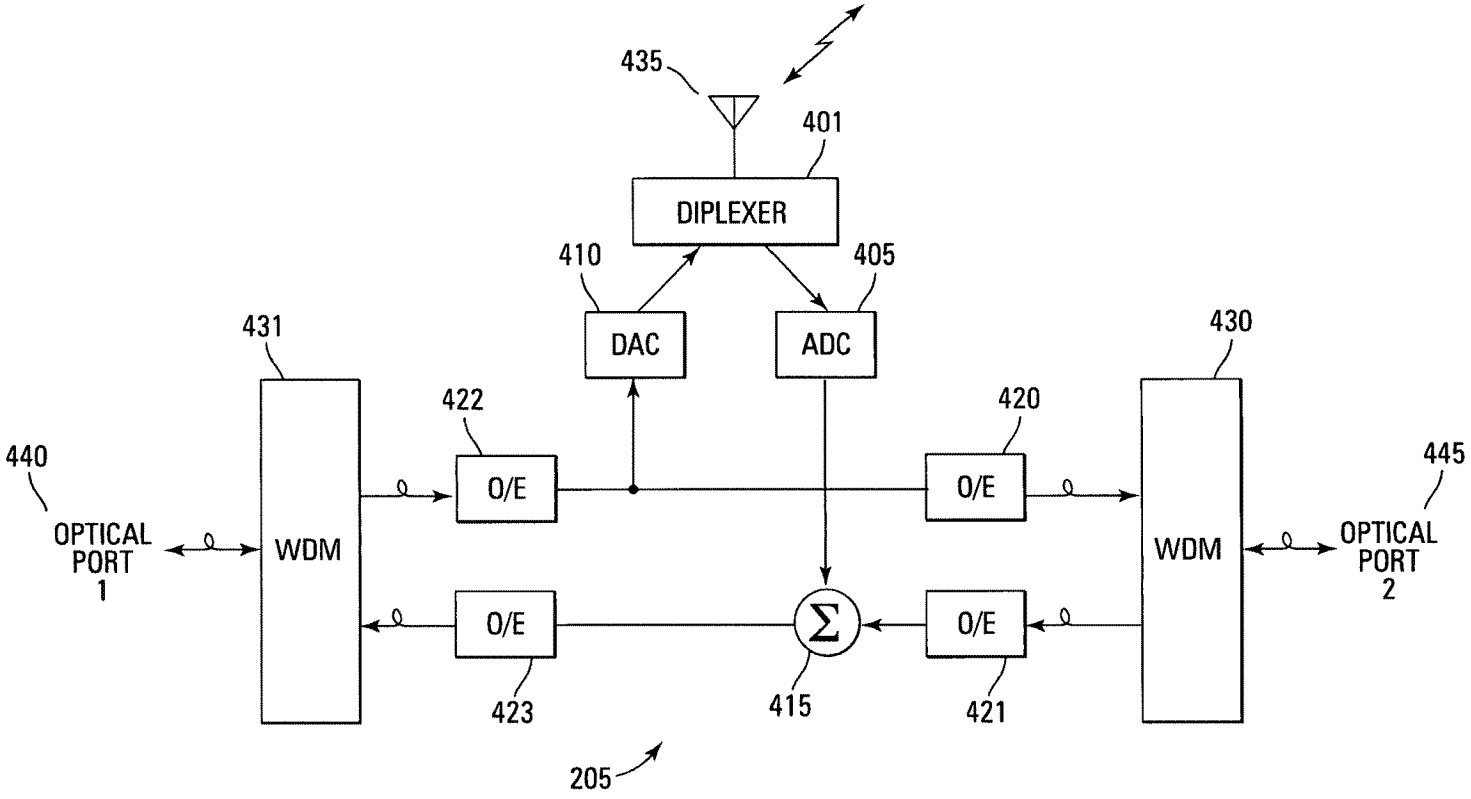
FIG. 4 shows a block diagram of one embodiment of a remote unit in accordance with the system of FIG. 2.

FIG. 4 illustrates a block diagram of one embodiment of a remote unit (205) of FIG. 2. Each of the remote units (205-208) of the embodiment of FIG. 1 is substantially identical in functional composition.

The remote unit (205) transmits and receives RF signals over the antenna (435). Both the receive and transmit circuitry are connected to the antenna (435) through a diplexer (401).

Alternate embodiments use other quantities of antennas. For example, one embodiment uses three antennas to cover three sectors of an area.

An analog signal that is received on the antenna (435) is split off by the diplexer (401) to an analog-to-digital converter (405). The analog-to-digital converter (405) digitizes the received analog signal by periodically sampling the signal. The sampling generates a digital representation of the received analog signal.

The digitized received signal is input to a summer (415) to be added to the digitized signals from the preceding remote units in the daisy-chain. The host unit thus receives a summation signal that represents the sum of all the signals received by the remote units (205-208) of the system.

A digital signal from the host unit is coupled to a digital-to-analog converter (410). The digital-to-analog converter (410) takes the digital representation of an analog signal and converts it to the analog signal for transmission by the antenna (435).

Optical-to-Electrical converters (420-423) are located at the optical ports (440 and 445) of the remote unit (205). Each optical port (440 and 445) has an input and an output that are each coupled to an Optical-to-Electrical converter (420-423).

Since the remote unit (205) operates with electrical signals that are represented by the optical signals coming in through the optical ports (440 and 445), the Optical-to-Electrical converters (420-423) are responsible for converting the optical signals to electrical signals for processing by the remote unit (205). The Optical-to-Electrical converters (420-423) are also responsible for converting received electrical signals from electrical to an optical representation for transmission over the optical fiber.

A wavelength division multiplexer (WDM) (430 and 431) is located at each optical port (440 and 445). The WDMs (430 and 431) perform the optical processing necessary to combine several optical signals having several wavelengths. The WDMs (430 and 431) also perform the optical demultiplexing necessary to split the multiple wavelengths of a single fiber to their own signal paths.

In summary, the distributed digital antenna system provides multiple daisy-chained antennas on a single medium such as optical fiber. The fiber can be tapped anywhere along its length multiple times to provide economical radio coverage in areas where a base station would be cost prohibitive.

Numerous modifications and variations of the present invention are possible in light of the above teachings. It is therefore to be understood that within the scope of the appended claims, the invention may be practiced otherwise than as specifically described herein.

What is claimed is:

1. A distributed digital antenna system comprising:

a host unit [that converts a] *configured to receive a first signal from a base station communicatively coupled to the host unit and to transmit a second signal to the base station, the host unit further configured to convert the* first signal to a transmitted digital optical signal and [that converts] *to convert* a received digital optical signal to [a] *the* second signal[;], *wherein the host unit is configured to transmit and receive signals over* an optical medium coupled to the host unit[to carry the transmitted and received digital optical signals]; and a plurality of remote units daisy-chained along the optical medium such that each *particular* remote unit *of the plurality of remote units* transmits an analog representation of the transmitted digital optical signal and receives radio frequency signals that are converted by the *particular* remote unit to a digitized received spectrum, each *particular remote unit* of the *plurality of* remote units including a summer that sums the digitized received spectrum with a corresponding digitized received spectrum from any preceding remote unit of the *plurality of remote units* daisy-chained [remote units] *along the optical medium* to generate the received digital optical signal for transmission to the host unit.

2. The *distributed digital antenna* system of claim 1, wherein the first *signal* and *the* second [signals] *signal* are transported over an optical, electrical or wireless medium.

3. The *distributed digital antenna* system of claim 1, wherein the optical medium is an optical fiber.

4. The *distributed digital antenna* system of claim 1[and further including a], *wherein the* base station[, coupled to the host unit, that communicates] *is configured for communicating* with subscriber units over a radio frequency air interface.

5. The *distributed digital antenna* system of claim [4] *1*, wherein the base station transmits the first signal and receives the second signal.

6. The *distributed digital antenna* system of claim [4] *1*, wherein the base station communicates signals from the host unit to a public switched telephone network.

7. A distributed digital antenna system that communicates signals with a base station that is coupled to a data network, the *distributed digital antenna* system comprising:

a host unit [that converts] *configured to receive forward link radio frequency signals from the base station and the transmit reverse link radio frequency signals to the base station, the host unit further configured to convert the forward link* radio frequency signals *received* from the base station to *forward link* digital optical signals and [that converts] *to convert reverse link* digital optical signals from the *distributed* digital antenna system to *reverse link* radio frequency signals for use by the base station[;], *wherein the host unit is configured to communicate the forward link digital optical signals across* an optical medium coupled to the host unit[that carries the digital optical signals]; and a plurality of remote units daisy-chained along the optical medium such that each *particular* remote unit *of the plurality of remote units* transmits *first* radio frequency signals over an air interface as an analog representation of the digital optical signals from the base station and receives *second* radio frequency signals over the air interface that are converted by [a receiving] *the particular* remote unit to a digitized received spectrum, each *particular remote unit* of the *plurality of* remote units [and the receiving remote unit] including a summer that sums the digitized received spectrum with a corresponding digitized received spectrum from any preceding remote unit of the *plurality of remote units* daisy-chained [remote units] *along the optical medium* to generate the [received] *reverse link* digital optical signals for use by the host unit.

8. The *distributed digital antenna* system of claim 7, wherein the *forward link* radio frequency signals *and the reverse link radio frequency signals communicated* between the base station and the host unit are carried over an optical link.

9. The *distributed digital antenna* system of claim 7, wherein the optical medium is an optical fiber that carries multiple wavelengths.

10. The *distributed digital antenna* system of claim 7, wherein the optical medium is a first optical fiber that carries a first wavelength from the host unit to the plurality of remote units and a second optical fiber that carries a second wavelength from the plurality of remote units to the host unit.

11. The *distributed digital antenna* system of claim 10, wherein the second wavelength carries a digital signal that represents a summation of signals received by each of the plurality of remote units.

12. The *distributed digital antenna* system of claim 7, wherein *each remote unit of* the plurality of remote units [each comprise] *comprises*:

an antenna that communicates the *forward link* radio frequency signals *and the reverse link radio frequency signals* over the air interface;

a plurality of optical-to-electrical converters that convert forward link digital optical signals input to the remote unit to forward link digital electrical signals and that convert reverse link electrical signals in the digitized received spectrum to reverse link digital optical signals for output to the host unit;

a digital to analog converter that converts the forward link digital electrical signals to the analog representation;

an analog-to-digital converter that converts the [received] *reverse link* radio frequency signals to the reverse link electrical signals in the digitized received spectrum; and wherein the summer sums the reverse link electrical signals in the digitized received spectrum with corresponding reverse link electrical signals in the *corresponding* digitized received spectrum from the *any* preceding remote [units] *unit* of the *plurality of remote units daisy-chained along the* optical medium [daisy-chain] to generate the [received] *reverse link* digital optical signals.

13. A remote unit in a distributed digital antenna system that communicates signals with a base station, the remote unit comprising:

an antenna that communicates radio frequency signals using an air interface standard;

a plurality of optical-to-electrical converters that convert input digital optical signals, from a host unit coupled to the base station and a daisy-chain of previous remote units, to forward link digital electrical signals;

a digital to analog converter that converts the forward link digital electrical signals to analog signals for transmission by the antenna as *forward link* radio frequency signals;

an analog-to-digital converter that converts *reverse link* radio frequency signals from the antenna to a digitized spectrum of reverse link electrical signals; and a summer that sums the reverse link electrical signals in the digitized spectrum from the analog-to-digital converter [to] *with* corresponding reverse link electrical signals from the daisy-chain of previous remote units to generate an output digital optical signal.

14. The remote unit of claim 13[and], further [including] *comprising*:

a first optical port that is coupled to either the host unit or a subsequent remote unit of the daisy-chain of remote units; and a second optical port that is coupled to the daisy-chain of previous remote units.

15. The remote unit of claim 13, wherein a first optical-to-electrical converter of the plurality of optical-to-electrical converters converts an optical summation signal from the daisy-chain of previous remote units to the output digital optical signal and a second optical-to-electrical converter converts an optical transmit signal from the host unit to [the] *a* forward link digital electrical signal for conversion to an analog signal by the digital to analog converter.

16. A remote unit in a distributed digital antenna system that communicates signals with a base station, the remote unit comprising:

an antenna that communicates radio frequency signals using an air interface standard;

a plurality of optical-to-electrical converters that convert *forward link* digital optical signals, from a host unit coupled to the base station and a daisy-chain of previous remote units, to forward link digital electrical signals, the plurality of optical-to-electrical converters further convert reverse link digital electrical signals to *reverse link* digital optical signals, each *forward link* digital optical signal *of the forward link digital optical signals and each reverse link digital optical signal of the reverse link digital optical signals* comprising a wavelength;

a digital to analog converter that converts the forward link digital electrical signals to analog signals for transmission by the antenna as *forward link* radio frequency signals;

an analog-to-digital converter that converts *reverse link* radio frequency signals from the antenna to a digitized spectrum of reverse link electrical signals;

a summer that sums the reverse link electrical signals in the digitized spectrum from the analog-to-digital converter to an output digital optical signal from the daisy-chain of previous remote units; and a wavelength division multiplexer that demultiplexes an input digital optical signal, comprising a plurality of wavelengths, to the digital optical signals each having a *particular* wavelength in the plurality of wavelengths, the wavelength division multiplexer further multiplexes *the* digital optical signals to the output digital optical signal comprising the plurality of wavelengths.

17. A method for communicating over a distributed digital antenna system, the method comprising:

converting a first radio frequency signal from a base station to a *forward link* digital optical signal;

transmitting the *forward link* digital optical signal over an optical medium to a plurality of remote units in a daisy-chain configuration along the optical medium;

converting the *forward link* digital optical signal to a forward link digital electrical signal at each remote unit;

converting the forward link digital electrical signal to an analog signal for transmission by at least one of the *plurality of* remote units as a second radio frequency signal;

receiving a third radio frequency signal over an air interface of *the* at least one of the *plurality of* remote units;

converting the third radio frequency signal to a [received] *reverse link* electrical signal within a digitized spectrum; and summing the digitized spectrum of the [received] *reverse link* electrical signal with a corresponding digitized spectrum of [received] *reverse link* electrical signals from previous remote units in the daisy-chain configuration.

18. The method of claim 17[and], further [including] *comprising*:

converting a result of the summing of the digitized spectrum of the [received] *reverse link electrical signal with the corresponding digitized spectrum of the reverse link* electrical signals *from the previous remote units in the daisy-chain configuration* to a *reverse link* digital optical signal;

transmitting the *reverse link* digital optical signal over the optical medium; and converting the *reverse link* digital optical signal to a fourth radio frequency signal for use by the base station.

19. The method of claim 17[and], further [including] *comprising:* demultiplexing the *forward link* digital optical signal into a plurality of optical signals each having one wavelength.

20. The method of claim 18[and], further [including the base station] *comprising:* transmitting information in the fourth radio frequency signal *from the base station* to a public switched telephone network.

21. The method of claim 18[and], further [including] *comprising:* multiplexing single wavelength optical signals from [the] *a particular* remote unit into a single optical signal comprising a plurality of wavelengths.

22. A method for a remote terminal to communicate with a wireless terminal in a geographic area, the method comprising:

converting an optical signal to a forward link electrical signal;

converting the forward link electrical signal to a forward link analog signal;

transmitting the forward link analog signal to the wireless terminal;

receiving a reverse link analog signal from the wireless terminal;

converting the reverse link analog signal to a reverse link electrical signal;

summing a digitized spectrum of the reverse link electrical signal with a corresponding digitized spectrum of other reverse link electrical signals from other remote terminals that are daisy-chained together over an optical link *to create a summed digitized spectrum of reverse link electrical signals*; and converting the summed digitized spectrum of reverse link electrical signals to a reverse link summed optical signal for transmission to a host unit *communicatively coupled to a base station*.

23. The [system] *method* of claim [1]*22*, [wherein] *further comprising:*

*receiving, at* the host unit[receives], a total digitized received spectrum representing [the] *a* sum of all digitized received spectrum from [the] *a* plurality of remote [units] *terminals including the remote terminal and the other remote terminals*.

24. The method of claim [22]*23*, wherein the summed digitized spectrum of reverse link electrical signals represents a sum of the digitized spectrum of the reverse link electrical signals of [all] the *plurality of* remote terminals[that are daisy-chained together over the optical link].

*25. A distributed digital antenna system comprising:*

*a host unit configured to receive a first signal from a base station communicatively coupled to the host unit and to transmit a second signal to the base station, the host unit further configured to convert the first signal to a transmitted digital signal and to convert a received digital signal to the second signal, wherein the host unit is configured to transmit and receive signals over a medium coupled to the host unit; and*

*a plurality of remote units daisy-chained along the medium such that each particular remote unit of the plurality of remote units transmits an analog representation of the transmitted digital signal and receives radio frequency signals that are converted by the particular remote unit to a digitized received spectrum, each particular remote unit of the plurality of remote units including a summer that sums the digitized received spectrum with a corresponding digitized received spectrum from any preceding remote unit of the plurality of remote units daisy-chained along the optical medium to generate the received digital signal for transmission to the host unit.*

* * * * *